(12) United States Patent
Florio et al.

(10) Patent No.: US 9,969,930 B2
(45) Date of Patent: May 15, 2018

(54) ADDITIVE FABRICATION OF PROPPANTS

(71) Applicant: Halliburton Energy Services, Inc., Houston, TX (US)

(72) Inventors: Steven Florio, Houston, TX (US); Christopher E. Coker, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days. days.

(21) Appl. No.: 14/908,708

(22) PCT Filed: Aug. 12, 2014

(86) PCT No.: PCT/US2014/050608
§ 371 (c)(1),
(2) Date: Jan. 29, 2016

(87) PCT Pub. No.: WO2015/023612
PCT Pub. Date: Feb. 19, 2015

(65) Prior Publication Data
US 2016/0168453 A1    Jun. 16, 2016

Related U.S. Application Data

(60) Provisional application No. 61/866,132, filed on Aug. 15, 2013.

(51) Int. Cl.
*C09K 8/80* (2006.01)
*C09D 11/30* (2014.01)
*C04B 35/622* (2006.01)

(52) U.S. Cl.
CPC ............ *C09K 8/805* (2013.01); *C04B 35/622* (2013.01); *C09D 11/30* (2013.01); *C09K 8/80* (2013.01); *C04B 2235/6026* (2013.01); *C04B 2235/665* (2013.01)

(58) Field of Classification Search
None
See application file for complete search history.

(56) References Cited

U.S. PATENT DOCUMENTS

| | | |
|---|---|---|
| 4,156,495 A | 5/1979 | Weinhold |
| 4,247,508 A | 1/1981 | Housholder |
| 4,393,021 A | 7/1983 | Eisenberg et al. |
| 4,440,866 A * | 4/1984 | Lunghofer ............... B01J 2/16 264/117 |
| 4,536,535 A | 8/1985 | Usala |
| 4,818,562 A | 4/1989 | Arcella et al. |
| 4,863,538 A | 9/1989 | Deckard |
| 4,871,489 A | 10/1989 | Ketcham |
| 5,017,753 A | 5/1991 | Deckard |
| 5,076,869 A | 12/1991 | Bourell et al. |
| 5,121,329 A | 6/1992 | Crump |
| 5,136,515 A | 8/1992 | Helinski |
| 5,147,587 A | 9/1992 | Marcus et al. |
| 5,201,916 A | 4/1993 | Berg et al. |
| 5,204,055 A | 4/1993 | Sachs |
| 5,296,062 A | 3/1994 | Bourell et al. |
| 5,387,380 A | 2/1995 | Cima et al. |
| 5,387,474 A | 2/1995 | Mikeska et al. |
| 5,407,474 A | 4/1995 | Airey et al. |
| 5,500,162 A | 3/1996 | Theisen |
| 5,555,176 A | 9/1996 | Menhennett et al. |
| 5,609,919 A | 3/1997 | Yuan et al. |
| 5,649,277 A | 7/1997 | Greul et al. |
| 5,738,817 A | 4/1998 | Danforth et al. |
| 5,779,833 A | 7/1998 | Cawley et al. |
| 5,948,471 A | 9/1999 | Zimmer |
| 5,992,756 A | 11/1999 | Newcombe |
| 6,027,326 A | 2/2000 | Cesarano et al. |
| 6,030,199 A | 2/2000 | Tseng |
| 6,054,093 A | 4/2000 | Torre |
| 6,135,357 A | 10/2000 | Herrin |
| 6,177,151 B1 | 1/2001 | Chrisey et al. |
| 6,271,816 B1 | 8/2001 | Jeong et al. |
| 6,280,799 B1 | 8/2001 | Okabe et al. |
| 6,291,123 B1 | 9/2001 | Ohno et al. |
| 6,330,857 B1 | 12/2001 | Mazimovsky et al. |
| 6,398,989 B1 | 6/2002 | Bergstrom |
| 6,401,001 B1 | 6/2002 | Jang et al. |
| 6,402,403 B1 | 6/2002 | Speakman |
| 6,460,980 B1 | 10/2002 | Hegedus et al. |

(Continued)

OTHER PUBLICATIONS

"Net-Shaping of Ceramic Components by Using Rapid Prototyping Technologies" Advances in Ceramics-Synthesis and Characterization, Processing and Specific Applications, Tian et al. dated Aug. 9, 2011.
China packaging yearbook 2011-2012, p. 187, Dec. 2012.
Chinese Office Action for Application No. 2014800453921 dated Feb. 24, 2017.
International Search Report and Written Opinion for International Application No. PCT/US2014/050608 dated Feb. 4, 2015.

(Continued)

*Primary Examiner* — Jeffrey Washville
(74) *Attorney, Agent, or Firm* — Craig W. Roddy; Tumey L.L.P.

(57) ABSTRACT

Ceramic inks formulated for additive formation of proppants are provided, as well as methods of manufacturing such ink and ink systems including such ink. The proppant formed can contain a proppant core, a proppant shell, a proppant outer coating or any combination thereof. Additive methods for forming proppants are also provided. The ceramic ink can be applied drop-wise, linearly, in a planar fashion, or any combination thereof to form proppants. Additive fabricators configured to produce proppant are further provided, as are systems including the same and software for running the same.

18 Claims, No Drawings

(56) References Cited

U.S. PATENT DOCUMENTS

| | | |
|---|---|---|
| 6,504,559 B1 | 1/2003 | Newton et al. |
| 6,508,980 B1 | 1/2003 | Sachs et al. |
| 6,596,224 B1 | 7/2003 | Sachs et al. |
| 6,620,214 B2 | 9/2003 | McArdle et al. |
| 6,659,364 B1 | 12/2003 | Humberstone et al. |
| 6,764,720 B2 | 7/2004 | Pui et al. |
| 6,780,368 B2 | 8/2004 | Liu et al. |
| 6,938,987 B2 | 9/2005 | Ellson et al. |
| 6,990,904 B2 | 1/2006 | Ibarra et al. |
| 7,261,542 B2 | 8/2007 | Hickerson |
| 7,378,052 B2 | 5/2008 | Harryson |
| 7,387,757 B2 | 6/2008 | Mulligan |
| 7,459,209 B2 | 12/2008 | Smith et al. |
| 7,491,444 B2 | 2/2009 | Smith et al. |
| 7,569,199 B1 | 8/2009 | Barron et al. |
| 7,632,434 B2 | 12/2009 | Duescher |
| 7,765,949 B2 | 8/2010 | Fork et al. |
| 7,766,641 B2 | 8/2010 | Siverbrook |
| 7,767,130 B2 | 8/2010 | Elsner et al. |
| 7,767,132 B2 | 8/2010 | Patel |
| 7,824,602 B2 | 11/2010 | Sachs |
| 7,867,613 B2 | 1/2011 | Smith et al. |
| 7,883,773 B2 | 2/2011 | Smith et al. |
| 7,887,918 B2 | 2/2011 | Smith et al. |
| 7,914,715 B2 | 3/2011 | Aga |
| 7,914,892 B2 | 3/2011 | Smith et al. |
| 7,981,531 B2 | 7/2011 | Rheinberger et al. |
| 8,003,212 B2 | 8/2011 | Smith et al. |
| 8,012,533 B2 | 9/2011 | Smith et al. |
| 8,017,055 B2 | 9/2011 | Davidson et al. |
| 8,025,992 B2 | 9/2011 | Engels et al. |
| 8,033,812 B2 | 10/2011 | Collins et al. |
| 8,047,288 B2 | 11/2011 | Skala et al. |
| 8,075,997 B2 | 12/2011 | Smith et al. |
| 8,080,181 B2 | 12/2011 | Fork et al. |
| 8,133,831 B2 | 3/2012 | Laubersheimer |
| 8,157,908 B2 | 4/2012 | Williams |
| 8,168,570 B2 | 5/2012 | Barron et al. |
| 8,173,562 B2 | 5/2012 | Holand et al. |
| 8,178,476 B2 | 5/2012 | Xie et al. |
| 8,178,477 B2 | 5/2012 | Skala et al. |
| 8,256,091 B2 | 9/2012 | Duescher |
| 8,257,779 B2 | 9/2012 | Abernathy et al. |
| 8,287,959 B2 | 10/2012 | Batchelder |
| 8,298,667 B2 | 10/2012 | Smith et al. |
| 8,308,271 B2 | 11/2012 | Seki et al. |
| 8,603,578 B2 | 12/2013 | Smith et al. |
| 8,728,991 B2 | 5/2014 | Wu et al. |
| 8,916,505 B2 | 12/2014 | Skala |
| 8,944,817 B2 | 2/2015 | Fischler |
| 2002/0195747 A1 | 12/2002 | Hull et al. |
| 2004/0081573 A1 | 4/2004 | Newell |
| 2005/0001356 A1 | 1/2005 | Tochimoto et al. |
| 2010/0040767 A1 | 2/2010 | Uibel et al. |
| 2010/0249305 A1 | 9/2010 | Laubersheimer |
| 2011/0146985 A1* | 6/2011 | Xie .................... C03C 10/0045 166/280.2 |
| 2011/0232524 A1 | 9/2011 | Kim et al. |
| 2012/0227968 A1* | 9/2012 | Eldred .................. C09K 8/805 166/280.2 |
| 2012/0308837 A1 | 12/2012 | Schlechtriemen et al. |
| 2012/0315401 A1 | 12/2012 | Prampolini et al. |

OTHER PUBLICATIONS

Tian et al. Advances in Ceramics—Synthesis and Charachterization, Processing and Specific Applications. InTech. Chapter 13, Net-shaping of Ceramic Components by Using Rapid Prototyping Technologies 291-310, 2011.

* cited by examiner

US 9,969,930 B2

ADDITIVE FABRICATION OF PROPPANTS

This application claims the benefit under 35 U.S.C. § 371 of PCT Appl. No. US2014/050608, filed Aug. 12, 2014, which claimed the benefit under 35 U.S.C. § 119(e) of prior U.S. Provisional Patent Application No. 61/866,132, filed Aug. 15, 2013, which is incorporated in its entirety by reference herein.

BACKGROUND OF THE INVENTION

The present invention relates to additive methods, systems, and materials for producing proppants.

Proppant production has depended on multiple batch operations. A ceramic template is spray coated in a fluidized bed and then sintered to form a high strength ceramic proppant body. The nature of the batch-based process means that the final yield of product is generally compromised to some degree by losses at each step—from milling of the coating slurry to spraying of the fluidized bed template; to sintering; and to classification.

Digital deposition of ceramic inks is currently utilized in the high-volume production of decorated ceramic tiles using solid particle inks on ceramic substrates, solid particle inks on glass for decorative and functional purposes, organic inks on glass for decorative and functional purposes, and conductive inks on silicon for the production of solar cells. Heretofore printing of ceramic proppants has neither been performed nor contemplated.

SUMMARY OF THE PRESENT INVENTION

It is therefore a feature of the present invention to minimize handling losses, downtime associated with change-out to vary size and composition.

Another feature of the present invention is to maximize flexibility in terms of composition, morphology of proppants, and overall yield.

A further feature of the present invention is to provide higher aspect ratio, the ability to create layered structures, increased design flexibility, and off contact capability for fragile substrates in proppant production.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a ceramic ink. The ceramic ink can be formulated for additive formation of proppants. The ceramic ink can contain at least one ceramic material and at least one binding agent. The ceramic ink can be in the form of a dispersion, suspension, solution, colloid, sol, gel, paste, powder, solid, a tape, a film, or any combination thereof. Any suitable ceramic material or mixture of ceramic materials can be used in the ceramic ink. For example, the ceramic material can include a metal oxide, a metal oxide, a metal carbide, or any combination thereof. The ceramic ink can contain at least one solvent. The ceramic ink can contain a stabilizing agent, a polymerization initiator, a plasticizer, a dispersing agent, a viscosity agent, a tackifier, a metal hydride, or any combination thereof.

The present invention also relates to a method of manufacturing a ceramic ink. For example, the method can include mixing at least one ceramic material with at least one binding agent.

The present invention further relates to an ink system formulated for additive formation of proppants. For example, the ink system can include at least two ceramic inks differing in respect to chemical composition, at least one physical property, or both. The ink system can include a first ink containing at least one ceramic material and a second ink containing at least one binding agent.

The present invention still further relates to an additive method for forming proppants. At least one ceramic ink can be applied to a printer stage to form a green proppant. The green proppant can be sintered or cured to produce a proppant. The ceramic ink can be applied drop-wise, linearly, in a planar fashion, or any combination thereof. At least one layer of the green proppant can be formed from the application of the at least one ceramic ink. At least one layer can be cured after formation of the layer and optionally before formation of a subsequent layer. The proppant can contain a proppant core, a proppant shell, a proppant outer coating or any combination thereof. The green proppant can contain a green proppant core, a green proppant shell, a green proppant outer coating, or any combination thereof. The resultant green proppant can be further processed (dried and sintered or directly sintered) to form a high strength ceramic body of defined shape, size, density and chemical composition.

The present invention further relates to yet another additive method for forming proppants. At least one ceramic ink can be applied to a printer stage to form a powder bed. At least a portion of the proppant bed can be sintered or cured to produce a proppant. The powder bed can be formed in succeeding layers and the sintering or curing can be performed after the formation of each layer. The printer stage can be lowered after sintering each layer. The sintering can be performed using any technique, such as an oven, microwave, laser beam or an electron beam. The curing can be thermo, UV, or IR and the like.

The present invention also relates to an additive fabricator configured to produce proppants. The system can include a frame; a printer stage operatively associated with the frame; a printhead operatively associate with the frame, positionable above (at a height greater than) the printer stage, and configured to dispense at least one ceramic ink; and at least one actuator configured to move the printer stage and the printhead relative to one another. The printhead can include at least one extruder, at least one nozzle, or both. The additive fabricator can include at least one heater and/or at least one temperature sensor. The additive fabricator can include at least one energy source configured for sintering or curing the at least one ceramic ink deposited on the printer stage. Software designed to run on a microcontroller of additive fabricator is also provided by the present invention.

The present invention further relates to a system for additively producing proppants. For example, the system can include an additive fabricator configured to form green proppants and an oven configured to sinter the green proppants. The system can include a computer in operative communication with at least one of the additive fabricator and the oven, and be configured to send instructions to, receive data from, or both, at least one of the additive fabricator and the oven.

The present invention further relates to yet another additive fabricator configured to produce proppants. The additive fabricator can include a frame, a printer stage operatively associated with the frame, a powder bed positioned on the printer stage and configured to hold at least one ceramic ink, an energy beam source operatively associated with the frame and positionable above the printer stage; and at least one actuator configured to move the energy beam source and the printer stage relative to one another. The additive fabricator can also be part of a system that further includes a computer in operative communication with the additive fabricator and configured to send instructions to, receive data from, or both, the additive fabricator.

Formulated inks, the deposition head, and the integrated printer/software are all aspects of the present invention. It is to be understood that both the foregoing general description and the following detailed description are exemplary and explanatory only and are intended to provide a further explanation of the present invention, as claimed.

DETAILED DESCRIPTION OF THE PRESENT INVENTION

A ceramic ink is provided by the present invention. The ceramic ink can be formulated for additive formation of proppants. The ceramic ink can contain at least one ceramic material and at least one binding agent. The ceramic ink can be in the form of a dispersion, suspension, solution, colloid, sol, gel, paste, powder, solid, a tape, a film, or any combination thereof. Any suitable ceramic material or mixture of ceramic materials can be used in the ceramic ink. For example, the ceramic material can include at least one metal, at least one metal oxide, at least one metal carbide, or any combinations thereof. Any suitable binding agent or combination of binding agents can be used in the ceramic ink. For example, the binding agent can include a polymerizable monomer, a polymer, a resin, a wax, water, aqueous or non-aqueous solutions, or any combination thereof. The ceramic ink can contain at least one solvent. Any suitable solvent can be employed. The ceramic ink can contain a stabilizing agent, a polymerization initiator, a plasticizer, a dispersing agent, a viscosity agent, a tackifier, or a metal hydride, or any combinations thereof.

The amount of ceramic material in the ceramic ink can be varied to achieve proppants with desired properties. For example, the at least one ceramic material can contain at least 5 wt %, at least 10 wt %, at least 25 wt %, at least 50 wt %, at least 75 wt %, at least 90 wt %, at least 95 wt %, or at least 99 wt % such as from 5 wt % to 100 wt % of the total weight of the ceramic ink. The ceramic ink can have any desired viscosity. For example, the ceramic ink can have a viscosity of from about 5.0 mPas to about 500 mPas, from about 25 mPas to about 400 mPas, from about 50 mPas to about 300 mPas, or from about 100 mPas to about 250 mPas.

Ceramics include inorganic materials that have a crystalline structure and are usually prepared from corresponding powders. Oxide ceramics are preferably obtained by sintering metal oxide powders, for example, $ZrO_2$ or $Al_2O_3$. Besides a crystalline phase, glass ceramics additionally contain one or more glass phases. Glass ceramics are materials that are usually prepared from amorphous glasses, in particular silicate glasses, by controlled crystallization and in which a glass phase and one or more crystal phases are present alongside each other in the solid. In the case of sinterable glass ceramics, both glass powders and glass ceramic powders can be used as a starting point.

Ceramic material, for example, ceramic particles, can contain oxide ceramic particles, glass ceramic particles, glass particles, or a combination thereof. Oxide ceramics are solid, polycrystalline, silicic acid-free materials of oxides or oxide compounds, for example, metal oxide powders. Glass ceramics are polycrystalline solids, which, in addition to one or more crystalline phases, additionally also contain glass phase proportions. Glass ceramics can be formed from glasses by controlled crystallization. For example, glass ceramics can contain leucite, apatite, and/or lithium disilicate. The crystallization can be initiated by debindering, sintering, or a separate temperature treatment. The oxide ceramic particles can contain one or more of $ZrO_2$ and/or $Al_2O_3$, for example, oxide particles of $ZrO_2$, $Al_2O_3$ or $ZrO_2$—$Al_2O_3$, or oxide particles of $ZrO_2$ or $ZrO_2$—$Al_2O_3$, stabilized with $Y_2O_3$, or MgO. The ceramic material can contain boehmite particles and/or aluminum hydrate. Aluminum and zirconium oxides can be stabilized by $HfO_2$, CaO, $Y_2O_3$, $CeO_2$, and/or MgO. The ceramic particles can be spherical, substantially spherical, or aspherical. The ceramic particles can be present in non-agglomerated form, for example entirely or predominantly in the form of primary particles. Ceramic particles can have, for example, on average a ratio of less than 20% in difference value between the maximum vertical length and the maximum horizontal length with respect to the maximum horizontal length of the cross-section of the particle. The ceramic powder can have a multi-modal size distribution, for example, the multi-modal size distribution can be in the range of from about 20 nm to about 200 μm, from about 50 nm to about 150 μm, from about 75 nm to about 125 μm, or greater than about 200 μm. The shape of the powder particles can be determined based on such a shape standard through observation of a cross-section or surface of a prepared ceramic thick film using a scanning electron microscope (SEM).

Essentially any high melting inorganic solid can be used as ceramic material, for example, such materials as $BaTiO_3$, $CaTiO_3$, $SrTiO_3$, $PbTiO_3$, $CaZrO_3$, $BaZrO_3$, $CaSnO_3$, $BaSnO_3$, $Al_2O_3$, metal carbides such as silicon carbide, metal nitrides such as aluminum nitride, minerals such as mullite and kyanite, zirconia and various forms of silica. High softening point glasses can be used as the ceramic material, which have sufficiently high softening points. Ceramic materials can include finely divided particles of known ceramic materials such as alpha alumina, silicon carbide, and/or alumina/zirconia. Chemical and/or morphological precursors such as aluminum trihydrate, boehmite, gamma alumina and other transitional aluminas and bauxite can be used. The ceramic can be an alpha-based alumina. The ceramic material can include one or more of alumina, ferric oxide, chromium oxide, magnesia; titania; zirconia; yttria; and rare earth metal oxides. Such additives can act as crystal growth limiters or boundary phase modifiers. Useful sinterable ceramic powder can include crystalline oxides, non-crystalline oxides, carbides, nitrides, silicides, borides, phosphides, sulfides, tellurides, and selenides. For example, aluminum oxide, silicon oxide, titanium oxide, zirconium oxide, alumina-zirconia, silicon carbide, titanium carbide, titanium boride, aluminum nitride, silicon nitride, ferrites, iron sulfide, or any combination thereof can be used.

Clays can be used as the ceramic material. Useful clay can include crystalline hydrate silicates of aluminum, iron, and magnesium compounds. For example, kaolin, ball clay, fire clay, bentonite, Fuller's earth, activated clays, calcined clays, and/or colloidal clays can be employed. Useful fluxing minerals can include materials that react at low temperatures with other materials present to form a glass phase, thus lowering the firing temperature. Useful fluxing minerals also include alkali or alkaline earth oxides, boric oxide, or lead oxide. Examples of fluxing minerals include potassium feldspar, sodium feldspar, calcium feldspar, nepheline syenite, talc, soda ash, borax, and lead oxides.

Glass powder as the ceramic material can include silicate or non-silicate based glass powder. Silicate based glass powder can be single-phase or multi-component systems. For example, a single-phase glass powder can include vitreous silica. Multi-component silicate glass powder typically contains modifiers or intermediates, such as, for example, metal oxides. Examples of multi-component silicate glass powder include alkali silicates, containing alkali metal oxides; soda-lime glasses, containing alkali and alkaline earth metal oxides, plus, typically, small amounts of alumina and other miscellaneous oxides; borosilicate glasses; aluminosilicate glasses; lead glasses. Non-silicate based glass powder can include vitreous metal and non-metal oxide systems, for example, $P_2O_5$, $GeO_2$, $B_2O_3$, $Al_2O_3$, $Li_2O$, $Na_2O$, $K_2O$, $BeO$, $MgO$, $CaO$, $BaO$, $PbO$, $ZnO$, and $FeO$. Other useful examples of non-silicate glasses include borate glasses, such as Lindemann glasses, phosphate glasses, calcium aluminate glasses, and calcium germanate glasses. Glass-ceramics can be, for example, at least 50% crystalline. Examples of crystalline phases include beta-quartz solid solution, beta-quartz solid solution, beta-spodumene solid solution, $Li_2OAl_2O_3(SiO_2)_{4-10}$, lithium metasilicate-lithium disilicate, $Li_2OSiO_2Li_2O_2SiO_2$, beta-spodumene solid solution-mullite, $Li_2OAl_2O_3(SiO_2)_{4-10}\cdot3Al_2O_3\cdot2SiO_2$; alpha-quartz soli solution-spinel-enstatite, $SiO_2$—$MgOAl_2O_3$—$MgOSiO_2$. Titanate or zirconates can be used as primary crystalline nuclei. Silica sols can be used as the ceramic material.

The ceramic ink can include a ceramic powder as well as one more other components, for example, one or more binding agent, solvent, stabilizing agent, polymerization initiator, plasticizer, dispersing agent, viscosity agent, tackifier, and/or other additives. The ceramic ink can actually omit ceramic material if the ceramic material is supplied separately, for example, the ceramic material can be supplied in a bed on the platform of a printer or applied as a separate stream/drop from that of the other components, for example, binding agents. Ceramic ink can be premixed in part or whole before printing. The ceramic ink can be a dispersion, suspension, solution, colloid, sol, gel, paste, powder, solid, or the like, or a combination thereof. The ceramic ink can be supplied in a packaging, such as a bag, jug, barrel, or cartridge. Mixing and/or preparation of the ceramic ink can occur before, during, or after the ink components are added to a printer for printing proppants. A clay slip, slurry, frit, flux, or engobe can be used as the ceramic ink. The ceramic ink can contain one or more types of ceramic particles and one or more types of dispersing agents. The ceramic ink can also contain one or more binding agents. Buffers can be utilized to adjust the pH of the ceramic ink as appropriate. For example, the ceramic ink can have a pH of from about 2 to about 12. The ceramic ink can contain solid metal oxide particles or fully-dissolved metal oxide precursors.

A ceramic ink can include a solvent having a ceramic powder dispersed therein. The solvent can include aqueous solvent, non-aqueous solvent, or both. The solvent can include methanol, ethanol, propanol, isopropanol or mixtures thereof such as a low molecular weight alcohol and a polyhydric alcohol, a long-chain hydrocarbon or mixtures thereof, for example glycerol and/or ethylene glycol. The solvent can contain a synthetic organic polyelectrolyte and/or a carboxylic acid preparation. For example, the synthetic organic polyelectrolyte can be polyacrylic acid and/or polymethacrylic acid having a weight average molecular weight of from about 4,000 to about 6,000. These acids can be present in the form of an alkali metal or ammonium salt. The use of synthetic organic polyelectrolytes can yield a suspension that does not foam and can be applied layerwise. Polyacrylic acids in the form of the ammonium salts can be used, which can be obtained from Zschimmer & Schwarz under the names Dolapix CE64, Dolapix PC75 and Dolapix ET85.

The solvent can include a mixture of a principal solvent and a drying controller. For example, the solvent can include a mixture of ethylene glycol monomethyl ether and dipropylene glycol monomethyl ether, a mixture of N,N-dimethylformamide and formamide, a mixture of acetonitrile and butanol, a mixture of nitromethane and butanol, and/or a mixture of water and N,N-dimethylformamide. In addition or in the alternative, the solvent can be one or more mixtures, for example, a mixture of ethylene glycol monomethyl ether and dipropylene glycol monomethyl ether, a mixture of NN-dimethylformamide and formamide, a mixture of acetonitrile and butanol, a mixture of nitromethane and butanol, and a mixture of water and N,N-dimethylformamide.

Ceramic inks can include radically polymerizable monomers or mixtures thereof as radically polymerizable binding agents. The monomer used can be homogeneously, i.e., without phase separation, miscible with other ink components such as wax. For example, monomers that have one or more, e.g. two, (meth)acryloyl groups can be used, such as monomers with (meth)acryloyloxy groups. Examples of suitable radically polymerizable monomers are (meth)acrylates and di(meth)acrylates with a chain length of the alcohol residue of from $C_8$ to $C_{18}$, such as for instance octadecyl acrylate; multi-(meth)acrylated glycols, such as multi-(meth)acrylated propylene glycols; multi-(meth)acrylated short- to medium-chain polypropylene glycols, for example, with a molecular weight of from about 200 D to about 2,000 D, or from about 300 D to about 1000 D, such as for instance dipropylene glycol diacrylate and polypropylene glycol diacrylates, for example, polypropylene glycol 400 diacrylate; pentaerythritol di(meth)acrylate monocarboxylates with a chain length of from $C_8$ to $C_{18}$, such as for instance pentaerythritol diacrylate monostearate, and mixtures thereof. The acrylated monomers can be, for example, methacrylated monomers, such as a mixture of octadecyl acrylate and pentaerythritol diacrylate monostearate. The monomer can, for example, be solid at 20° C. and can have a melting point in the range from about 30° C. to 120° C., or from about 40° C. to about 80° C.

Examples of binding agents also include poly(vinyl butyral), poly(vinyl acetate), poly(vinyl alcohol), cellulosic polymers such as methyl cellulose, ethyl cellulose, hydroxyethyl cellulose, methylhydroxyethyl cellulose, atactic polypropylene, polyethylene, silicon polymers such as poly (methyl siloxane), poly(methylphenyl siloxane), polystyrene, butadiene/styrene copolymer, polystyrene, poly (vinyl pyrollidone), polyamides, high molecular weight polyethers, copolymers of ethylene oxide and propylene oxide, polyacrylamides, and various acrylic polymers such as sodium polyacrylate, poly(lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid are also examples of binding agents.

A binding agent, for example, can have a softening point from about 45° C. to about 150° C. and a multiplicity of polar moieties such as carboxyl groups, hydroxyl groups, chloride groups, carboxylic acid groups, urethane groups, amide groups, amine groups, urea, epoxy resins, and the like. Some suitable binding agents within this class include polyester resins, bisphenol-A polyesters, polyvinyl chloride, copolymers made from terephthalic acid, polymethyl methacrylate, vinylchloride/vinylacetate resins, epoxy resins, nylon resins, urethane-formaldehyde resins, polyurethane, mixtures thereof, and the like.

The binding agent can include one or more resins. For example, a mixture of two synthetic resins can be used such as a mixture of from about 40 to about 60 weight percent of polymethyl methacrylate and from about 40 to about 60 weight percent of vinylchloride/vinylacetate resin based on the total weight of resin. The binding agent can contain polybutylmethacrylate and polymethylmethacrylate, for example, including from about 10 wt % to about 30 wt % of polybutylmethacrylate and from about 50 wt % to about 80 wt % of the polymethyl methacrylate based on the total weight of methacrylates. The binding agent can contain cellulose acetate propionate, ethylenevinylacetate, vinyl chloride/vinyl acetate, urethanes, and the like.

A curable binding agent can be cured by radiation energy or thermal energy. Radiation curable binder precursor material can contain at least one of epoxy resin, acrylated urethane resin, acrylated epoxy resin, ethylenically unsaturated resin, aminoplast resin having at least one pendant unsaturated carbonyl group, isocyanurate derivatives having at least one pendant acrylate group, isocyanate derivatives having at least one pendant acrylate group, or combinations thereof. Other useful radiation curable binder precursor material includes vinyl ethers.

Epoxy resins include monomeric epoxy resins and polymeric epoxy resins. These resins can vary greatly in the nature of their backbones and substituent groups. For example, the backbone can be any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of some epoxy resins include 2,2-bis[4-(2,3-epoxypropyloxy)phenyl]propane (diglycidyl ether of bisphenol A) and materials under the trade designation "EPON 828", "EPON 1004" and "EPON 1001F", commercially available from Shell Chemical Co. (Houston, Tex.), "DER-331", "DER-332" and "DER-334", commercially available from Dow Chemical Co. (Freeport, Tex.). Other suitable epoxy resins include glycidyl ethers of phenol formaldehyde novolac (for example, "DEN-431" and "DEN-428", commercially available from Dow Chemical Co.). The epoxy resins can polymerize via a cationic mechanism with the addition of appropriate photoinitiator(s).

An acrylated urethane resin can include, for example, a diacrylate ester of a hydroxy terminated isocyanate extended polyester or polyether. Examples of commercially available acrylated urethane resin include "UVITHANE 782" and "UVITHANE 783," both available from Morton Thiokol Chemical, Moss Point, Miss., and "CMD 6600", "CMD 8400", and "CMD 8805", all available from Radcure Specialties (Pampa, Tex.). Acrylated epoxy resin can include a diacrylate ester of epoxy resin, such as the diacrylate ester of an epoxy resin such as bisphenol. Examples of commercially available acrylated epoxy resin include "CMD 3500", "CMD 3600", and "CMD 3700", available from Radcure Specialties. Examples of ethylenically unsaturated resins include both monomeric and polymeric compounds that contain atoms of carbon, hydrogen, and oxygen, and optionally, nitrogen or the halogens. Ethylenically unsaturated resin can have a molecular weight of less than about 4,000 D, for example, an ester resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Examples of useful acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other useful ethylenically unsaturated resins include monoallyl, polyallyl, and polymethylallyl esters and amides of carboxylic acids, such as diallyl phthalate, diallyl adipate, and N,N-diallyladipamide. Still, other useful ethylenically unsaturated resins include styrene, divinyl benzene, and vinyl toluene. Other useful nitrogen-containing, ethylenically unsaturated resins include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Aminoplast resins can be monomeric or oligomeric. The aminoplast resins can have at least one pendant unsaturated carbonyl group per molecule, which can be alpha, beta. The alpha,beta-unsaturated carbonyl groups can be acrylate, methacrylate, or acrylamide groups. Examples include N-hydroxymethyl-acrylamide, N,N'-oxydimethylenebisacrylamide, ortho and para acrylamidomethylated phenol, acrylamidomethylated phenolic novolac, and combinations thereof. Isocyanurate derivatives can have at least one pendant acrylate group and isocyanate derivatives can have at least one pendant acrylate group. One such isocyanurate material is a triacrylate of tris(2-hydroxyethyl)isocyanurate. Examples of vinyl ethers suitable for this invention include vinyl ether functionalized urethane oligomers, commercially available from Allied Signal, Morristown, N.J., under the trade designations "VE 4010", "VE 4015", "VE 2010", "VE 2020", and "VE 4020".

The binding agent can also take the form of a constraining layer to reduce shrinkage during sintering, and it is applied as a flexible layer to the surfaces of the unfired ceramic circuit layers. The flexibility of the constraining layer enables the layer to conform closely to the topography of the unfired ceramic surface(s). A constraining layer can be spray coated, dip-coated or rolled onto the unfired ceramic in the form of a dispersion, or it may be formulated as a flexible sheet and laminated onto the unfired ceramic. Lamination is particularly effective in reducing the size of any gaps (flaws) between a constraining layer and surface(s) of ceramic body.

Waxes are another component that can be used in the ceramic inks of the present invention. Waxes can also be used as binding agents. As the chemical composition and origin of different waxes differ greatly, waxes are defined only via their mechanical-physical properties. A wax can be kneaded at 20° C., strong to brittle hard, have a coarse to finely crystalline structure and be translucent to opaque in color. Wax can melt above 40° C. without decomposing, be readily liquid (of low viscosity) a little above the melting point and not stringy. Wax can have a temperature-dependent consistency and solubility, and can be polished under light pressure. Waxes typically pass into the molten state between about 40° C. to about 130° C.; waxes are normally insoluble in water. Waxes for use in the ceramic inks of the present invention can have, for example, a melting point in the range of from about 40° C. to less than about 80° C., from about 45 to about 65° C., or from about 50 to about 60° C. or at 80° C. with a shear rate of 1000 s$^{-1}$.

Waxes can be divided into three main groups by origin: natural waxes (vegetable and/or animal waxes); mineral waxes and petrochemical waxes; and chemically modified waxes and synthetic waxes. The wax can include one wax type or a mixture of different wax types. Petrochemical waxes, such as for instance paraffin wax (hard paraffin), petroleum jelly, microcrystalline wax (micro paraffin) and mixtures thereof can be used. For example, SILIPLAST from Zschimmer & Schwarz (Lahnstein, Germany) can be used. Commercially available waxes often already contain emulsifiers and/or further components to adjust the rheology. Vegetable waxes such as candelilla wax, carnauba wax, Japan wax, esparto wax, cork wax, guaruma wax, rice germ oil wax, sugar cane wax, ouricury wax, and/or montan wax can be used. Animal waxes such as beeswax, shellac wax, spermaceti, lanolin (wool wax), and/or rump fat can be used. Mineral waxes such as ceresin or ozokerite (earth wax) can be used. Chemically modified waxes such as montan ester waxes, sasol waxes, and/or hydrogenated jojoba waxes can be used. Synthetic waxes, such as polyalkylene waxes or polyethylene glycol waxes can be used.

Stabilizing agents can improve the storage stability of the ceramic inks of the present invention and can also prevent an uncontrolled polyreaction. For example, stabilizing agents can be added in an amount that enables a ceramic ink to be stable over a period of from approximately 2 to 3 years. Examples of suitable stabilizing agents include the 2,2,6,6-tetramethylpiperidin-1-oxyl radical (TEMPO), phenothiazine, iodine, and copper(I) iodide. The inhibitors are preferably used in a quantity of from about 5 to about 500 wt-ppm, from about 50 to about 200 wt.-ppm, in each case relative to the total mass of the monomer(s).

The ceramic inks can contain a polymerization initiator as component, for example a photoinitiator and/or a thermal initiator. Radical photoinitiators for the visible range can be used, for example, acyl or bisacylphosphine oxides, preferably a-diketones such as 9,10-phenanthrenequinone, diacetyl, furil, anisil, 4,4'-dichlorobenzil and 4,4'-dialkoxybenzil and camphorquinone. To accelerate the initiation, alpha-diketones can be used, optionally in combination with aromatic amines. Redox systems that can be used include combinations of camphorquinone with amines, such as N,N-dimethyl-p-toluidine, N,N-dihydroxyethyl-p-toluidine, 4-dimethylaminobenzoic acid ethyl ester or structurally related systems. Norrish type I photoinitiators, above all monoacyltrialkyl- or diacyldialkylgermanium compounds, such as e.g. benzoyltrimethylgermanium, dibenzoyldiethylgermanium or bis(4-methoxybenzoyl)diethylgermanium can be used. Mixtures of the different photoinitiators can also be used, such as dibenzoyldiethylgermanium combined with camphorquinone and 4-dimethylaminobenzoic acid ethyl ester. The polymerization initiator can be used, for example, in a quantity of from about 0.001 vol % to 3.0 vol %, from about 0.01 vol % to 1 vol %, or from about 0.05 vol % to about 0.8 vol %, in each case relative to the total weight of the ceramic ink.

A thermal initiator can be used when thermal energy is used during curing, and photoinitiators can be used when ultraviolet and/or visible light is used during curing. The initiator used can depend on the type of the curable binder precursor used and/or the type of energy used during the curing step. For example, phenolic-based curable binder precursors typically do not involve the addition of an initiator when thermally cured. However, acrylate-based curable binder precursors typically do involve the addition of an initiator when thermally cured. As another example, initiators typically are not used when electron beam energy is used during curing. However, if ultraviolet or visible light is utilized, a photoinitiator is typically included in the composition. The total amount of initiator (either photoinitiator, thermal initiator, or combinations thereof) can be, for example, from about 0.1 wt % to about 10 wt % or from about 1.0 wt % to about 5 wt % based on the total weight of ceramic ink. Using both photoinitiator and thermal initiator, the weight ratio of photoinitiator to thermal initiator can be, for example, between about 3.5:1 to about 0.5:1.

Thermal polymerization is achieved by use of an appropriate thermal initiator, such as peroxide based initiators. WAZO materials available from E. I. du Pont de Nemours & Company (Wilmington, Del.) are examples of one type of suitable thermal initiators. Thermal initiators are activated by exposure to infrared (IR) radiation. Other thermal initiators are Azo-bis-isobutyronitrile thermal initiators are available from Electron Microscopy Sciences (Fort Washington, Pa.) and Azo initiators VA-044, VA-057, VA-085, VA-070 and VA-096 are available from Wako Specialty Chemicals, Ltd. Thermal initiators can also employ salts that provide cations that initiate cationic curing upon heating. Onium and pyridinium salts provide cationic species that can initiate thermal curing in epoxide compounds, such as compounds based on styrene oxide moieties linked to organic molecules, oligomers or polymers. N-benzylpyridinium and related quaternary ammonium salts provide acidic species under heating conditions.

Upon being exposed to thermal energy, a thermal initiator generates a free radical source. The free radical source then initiates the polymerization of the curable binder precursor. Exemplary thermal initiators include organic peroxides (e.g. benzoil peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Azo compounds suitable as thermal initiators can be obtained under the trade designations VAZO 52, VAZO 64, and VAZO 67 from DuPont.

Upon being exposed to ultraviolet or visible light, a photoinitiator generates a free radical source or a cationic source. This free radical or cationic source then initiates the polymerization of the deposited ceramic ink. Exemplary photoinitiators that generate a free radical source when exposed to ultraviolet light include, for example, organic peroxides, azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and any combination thereof.

Cationic photoinitiators generate an acid source to initiate the polymerization of an epoxy resin or a urethane. Exemplary cationic photoinitiators include a salt having an onium cation and a halogen-containing complex anion of a metal or metalloid. Other useful cationic photoinitiators include a salt having an organometallic complex cation and a halogen-containing complex anion of a metal or metalloid. Still other cationic photoinitiators include an ionic salt of an organometallic complex in which the metal can be chosen from the elements of Periodic Groups IVB, VB, VIB, VIM, and VIIIB. Ultraviolet-activated photoinitiators suitable for the present invention may be obtained under the trade designations IRGACURE 651, IRGACURE 184, IRGACURE 369 and IRGACURE 819 from Ciba Geigy Company (Winterville, Miss.), LUCIRIN TPO-L, from BASF Corp. (Livingston, N.J.), and DAROCUR 1173 from Merck & Co. (Rahway, N.J.).

If ultraviolet or visible light energy is used during curing, the ceramic ink can also include a photosensitizer. Photosensitizer can expand the wavelength at which the initiator or monomer forms free radicals. Exemplary photosensitizers include compounds having carbonyl groups or tertiary amino groups and mixtures thereof. Examples of compounds having carbonyl groups are benzophenone, acetophenone, benzil, benzaldehyde, o-chlorobenzaldehyde, xanthone, thioxanthene, 9,10-anthraquinone, and other aromatic ketones. Examples of tertiary amines are methyldiethanolamine, ethyldiethanolamine, triethanolamine, phenylmethylethanolamine, and dimethylaminoethylbenzoate. The photosensitizer can be, for example, from about 0.01 wt % to about 10 wt %, or from about 0.25 wt % to 4 wt % based on the total weight of the ceramic ink.

The ceramic ink can contain from about 0.1 wt % to about 20 wt %, based on the total weight of the ceramic ink, of one or more plasticizers adapted to plasticize the resin used. The plasticizer can serve to lower the glass transition temperature (Tg) of the binder polymer. The choice of plasticizers can be determined by the polymer being modified. Among the plasticizers which have been used in various binder systems are diethyl phthalate, butyl benzyl phthalate, dibutyl phthalate, dioctyl phthalate, butyl benzyl phthalate, alkyl phosphates, polyalkylene glycols, glycerol, poly(ethylene oxides), hydroxyethylated alkyl phenol, dialkyldithiophosphonate and poly(isobutylene). Any suitable plasticizer can be used, for example, adipic acid esters, phthalic acid esters, chlorinated biphenyls, citrates, epoxides, glycerols, glycol, hydrocarbons, chlorinated hydrocarbons, phosphates, esters of phthalic acid such as, e.g., di-2-ethylhexylphthalate, phthalic acid esters, polyethylene glycols, esters of citric acid, epoxides, adipic acid esters, and the like.

Any suitable dispersing agent can be used in the ceramic inks of the present invention. The dispersing agent can assist in dispersing oxidic particles in a non-polar medium. Suitable dispersion auxiliaries typically have a polar "anchor group" that can be bonded to the particle surface and a non-polar group pointing away from the particle which brings about a maximum steric stabilization of the suspension. Polyester-based dispersing agents, such as e.g., Hypermer LP-1 from Uniqema (Great Britain) can be used. The dispersing agent can be used in an amount of from about 0.1 wt % to about 5.0 wt %, from about 0.5 wt % to about 2.0 wt %, or from about 1.0 wt % to about 1.5 wt %, based on the total weight of the ceramic material of ceramic ink. Relative to the total composition of the ceramic ink, dispersing agents can be from about 0.3 vol % to about 16 vol %, from about 1.6 vol % to about 6.4 vol %, or from about 2.0 vol % to about 4.8 vol %.

A viscosity modifier can be added to the slip according to the invention, in order to reduce its viscosity in the liquid state. Longer chain, for example, $C_8$-$C_{20}$ olefins that are solid at room temperature and have a low melting point, such as for instance hexadecene and octadecene, can be used. The viscosity modifier can be removed from the proppant being formed, for example, by evaporation, and the ceramic ink is solidified to form the proppant. This approach can substantially minimize the undesirable effects of induced shear stress imposed on lower layers when attempting to apply uniform layers of highly viscous materials. Deposited ceramic ink can be transformed from a relatively low viscosity state to a relatively high viscosity state. This transformation can be achieved by removing a viscosity modifier from deposited ceramic ink by applying thermal heat to evaporate the viscosity modifier. Alternatively a solvent extraction process can be used to remove the solvent. The first viscosity value of the build material can be, for example, less than at least one-half of the second viscosity value. The transformation from the low viscosity state to the high viscosity state can be affected such that the second viscosity value of the build material is raised at least to a point where the ceramic material in the deposited ceramic ink is substantially self-supporting. A material that is substantially self-supporting is one that is able to hold its own shape under its own weight and able to do so when present in successive layers without containment walls. For example, semi-solids, gels, foams, and pastes are substantially self-supporting. Many high viscosity liquids are substantially self-supporting due to their thixotropic-type properties, and are particularly so when laid out in thin layers in SFF processes.

The viscosity modifier that is introduced into the build material can be a solvent such as an acetone or alcohol that can be removed after being dispensed by evaporation. A ceramic ink can be thinned using a viscosity modifier such as methyl ethel ketone (MEK) to reduce the viscosity to under 10,000 centipoise at ambient conditions. The viscosity modified ceramic ink can exhibit liquid-like properties even with the presence of solid particulate matter such as a powder. Suitable solvents that can be used as viscosity modifiers include, for example, hydrocarbons, aliphatic hydrocarbons, naphtha, mineral oil, aromatic hydrocarbons, benzene, toluene, functional aromatics, O-Cresol, halogenated hydrocarbons, chlorinated solvents, carbon tetrachloride, carbon dioxide, freon, methylene chloride, monohydric alcohols, polyhydric alcohols, phenols, ethers, tetrahydrofuran, glycol ethers, ketones, acetone, cyclohexanone, acetophenone, amines, n-Butylamine, N, N-Dimethylaniline, acids, chromic acids, nitric acids, phosphoric acids, inorganics, water, silicon tetrachloride, phosphoric trichloride, esters, N-Butyl acetate, ethyl acetate, nitrogen-containing compounds, nitrates, nitriles, organic sulfur compounds, acids/aldehydes, acetic acid, trichloroactic acid, hydroxide bases, ammonium hydroxide, sodium hydroxide, peroxides, hydrogen peroxide, and any combination thereof.

A tackifier can be included in the ceramic inks of the present invention. The tackifier can be added to improve the film strength between layers, helping to minimize curl and delamination problems. The tackifier provides a higher apparent viscosity to the build material and improves the film strength of the material. The tackifier can be, for example, a polymethyl methacrylate in the form of a powder that dissolves in the presence of a solvent selected as the viscosity modifier, although other tackifiers can be used, if desired. Two suitable polymethyl methacrylates are sold under the tradenames ELVACITE 2042, and ELVACITE 2043, and are available from ICI Acrylics (Wilmington, Del.).

A metal hydride powder can be added to the ceramic ink, for example, when using selective laser sintering (SLS). After removal of unfused material from the green proppant, the proppant can be placed in an oven or furnace in a non-reactive atmosphere such as, for example, nitrogen or argon for subsequent heat treatment to decompose and drive off binding agents and sinter the ceramic particles. During the step of decomposing binding agents and/or other components of the ceramic ink, the metal hydride begins to decompose also and releases an in-situ concentration of hydrogen gas that creates the reducing conditions for thoroughly decomposing polymer fragments so that the hydrocarbon fragments can escape the skeleton structure of the article. Metal hydrides that can be employed in the present invention include, for example, titanium hydride, nickel-metal-hydride, magnesium hydride, lithium aluminum hydride, calcium hydride, sodium hydride, and sodium borohydride and combinations thereof.

Any suitable additive can be included in the ceramic inks of the invention. In addition to those already discussed, coupling agents, wetting agents, flowing agents, surfactants, defoaming agents, and any combination thereof can be used. Coupling agents tend to enhance the adhesion between ceramic materials and binding agents. Examples of coupling agents suitable for this invention include silanes, organosilanes, zircoaluminates, and titanates. Wetting agents, or surfactants, tend to control rheology of the composition during processing. In general, any type of wetting agent, i.e., anionic, cationic, nonionic, amphoteric, zwitterionic, etc., can be employed in the composition. Useful examples of wetting agents include INTERWET 33 from Chemie America Interstab Chemicals (New Brunswick, N.J.); FLUORAD from 3M Co. (St. Paul, Minn.), or AEROSOL OT from The Dow Chemical Company (Midland, Mich.). Flowing agents can minimize caking of powders during processing. Useful examples of flowing agents include condensates of ethylene oxide and unsaturated fatty acids.

Green ceramic proppants can be formed using any desired technique or combination of techniques. These techniques include at least three classes including are plane-by-plane formation, line-line, and point-by-point. Plane-by-plane techniques involve the formation of the ceramic in a single planar layer, or by multiple superimposed layers. Line-by-line techniques involve the deposition of single or sequential solidifying lines of predetermined shape(s) onto a base platform to develop a predetermined 3-D shape, typically using CAD and/or CAM to drive the movement of the depositing head. Point-by-point techniques involve the drop-wise deposition of a bead or droplet onto a receiving platform in a predetermined pattern, typically using CAD and/or CAM to drive the movement of the depositing head. Deposition can be achieved by laser jet thermal transfer, Raleigh breakup inkjet, screen printing, and bead formation. Proppants can be formed using techniques, systems, printers, ceramic inks, and/or other materials described in the following U.S. patents and patent application publications: U.S. Pat. Nos. 4,156,495; 4,393,021; 4,536,535; 4,818,562; 4,871,489; 5,121,329; 5,136,515; 5,147,587; 5,201,916; 5,204,055; 5,387,380; 5,387,474; 5,407,474; 5,500,162; 5,555,176; 5,609,919; 5,649,277; 5,738,817; 5,779,833; 5,948,471; 5,992,756; 6,027,326; 6,030,199; 6,054,093; 6,135,357; 6,177,151; 6,271,816; 6,280,799; 6,291,123; 6,330,857; 6,398,989; 6,401,001; 6,402,403; 6,460,980; 6,504,559; 6,508,980; 6,596,224; 6,620,214; 6,659,364; 6,764,720; 6,780,368; 6,938,987; 6,990,904; 7,261,542; 7,378,052; 7,387,757; 7,632,434; 7,765,949; 7,766,641; 7,767,130; 7,767,132; 7,824,602; 7,914,715; 7,981,531; 8,017,055; 8,025,992; 8,033,812; 8,080,181; 8,133,831; 8,157,908; 8,173,562; 8,256,091; 8,257,779; 8,287,959; 8,308,271; 2002/0195747; 2004/0081573; 2010/0040767; 2010/0249305; 2011/0232524; and 2012/0308837, all incorporated in their entireties by reference herein.

A method of manufacturing a ceramic ink is provided by the present invention. For example, the method can include mixing at least one ceramic material with at least one binding agent. A ceramic ink can be formed by mixing ceramic particles are first mixed in a mixer, and this mixture can then be then processed in a dissolver, in order to achieve an effective deagglomeration of the particles. The homogenized mixture can then diluted in a further mixing and homogenization step, with additional components added, to the solids content suitable for the printing and worked with the dissolver or other mixing apparatus into a homogeneous mixture. For ceramic ink formulated for drop-on-demand printing, the ceramic ink can be liquid at the temperature in the printhead nozzle as well as having particulates having a diameter less than the inner diameter of the nozzle.

An ink system formulated for additive formation of proppants is provided by the present invention. For example, the ink system can include at least two ceramic inks differing in respect to chemical composition, at least one physical property, or both. The ink system can include a first ink containing at least one ceramic material and a second ink containing at least one binding agent. Each ink can be provided in its own cartridge. Multiple cartridges can be collectively packaged.

An additive method for forming proppants is provided by the present invention. At least one ceramic ink can be applied to a printer stage to form a green proppant. The green proppant can be sintered to produce a proppant. The sintering can be performed on the sintering stage and/or in a separate oven. The ceramic ink can be applied drop-wise, linearly, in a planar fashion, or any combination thereof. At least one layer of the green proppant can be formed from the application of the at least one ceramic ink. The printer stage can be lowered after forming the at least one layer and before applying a subsequent layer. At least one layer can be cured after formation of the layer and before formation of a subsequent layer. The ceramic ink can include at least one binding agent, that is, the binding agent can be removed from the proppant after it has served its role. The at least one binding agent can contain at least one monomer and further contain at least one polymerization initiator. The green proppant can be debindered. Energy can be applied to the applied ceramic ink to generate polymerization.

Ceramic ink can be flowed through a printhead, for example, by gravity, positive pressure, negative pressure, or any combination thereof. The printhead can include at least one nozzle, at least one extruder, at least one screen, or any combination thereof. The printer stage, the printhead, or both can be heated. The layers (and/or drops) forming the proppants are printed onto a planar support material, a printer stage, for example, a graphite plate, a platinum sheet, a ceramic or a glass-ceramic. The printer stage can be temperature controlled so as to have a temperature below, equal to, or above the temperature of the ceramic ink. Temperature control can be achieved using one or more heating or cooling units in thermal communication with the printing stage. The printing stage can include one or more molds to help shape and form the proppants. The printer stage can be moved along x, y, and/or z axes. For example, the printer stage can be lowered as successive layer of ceramic ink are applied to build the proppant. The printer stage can be rotated.

At least one support material can be applied to the printer stage. Depending on the geometry of the proppant being formed, a support material can be applied before, during, and/or after deposition of the ceramic ink to help achieve and maintain the desired geometry of the proppant. Proppants can be printed onto a support material having defined dimensions that can be removed during hardening of the proppant. A suspension containing a material that vaporizes during hardening can be used, which can enable the formation of a proppant that has specific recesses, openings, and the like. For example, a removable support material can be printed allowing for printing of overhanging features. After separating the printed object from any support structure, for example, by selective chemical dissolution of the support material, the green proppant is ready for subsequent step such as sintering. The support materials can contain non-strengthening inorganic fillers, for example, chalk, talc, to assist in removal of the support structure.

The support material can be removed after forming the green proppant. Once the printing process is concluded, the support material is optionally mechanically or chemically removed. The proppants are then chemically and/or thermally debindered and sintered. The debindering serves to remove the temporary binding agent as well as waxes and additives from the green proppant. The removal of the support material particularly can take place together with the debindering of the green body. Support material and binding agent can be removed thermally, for example, by melting, evaporation or combustion processes. To do so, the green proppant can be heated, for example, to a temperature of from about 50° C. to about 1800° C., from about 60° C. to about 600° C., or from about 150° C. to about 500° C. The heating can take place, for example, from about 1 hour to about 10 hours, from about 3 hours to about 7 hours, or about 5 hours.

At least two ceramic inks differing from one another can be applied. For example, the at least two ceramic inks can include a first ink containing ceramic material and a second ink containing a binding agent. The first ink can be applied before applying the second ink. The application of the first and second inks can be repeated multiple times to form the green proppant. The at least two ceramic inks can include a first ink containing a first ceramic material and a second ink containing a second ceramic material differing in chemical composition and/or at least one physical property from the first ceramic material.

The proppant can contain a proppant core, a proppant shell, a proppant outer coating or any combination thereof. The core, or template, of a proppant can be spherical, substantially spherical, or any other preferred geometry. The core can have any desired density, for example, a low density. The core can be hollow (for example, as in a cenosphere), semi-solid (for example, as in a synthetic template), and/or solid. The core can have a high enough strength to withstand subsequent processing, and be manufactured so that any fractures that form in the proppant result in the splitting of the proppant into a few large fragments. Additive proppant manufacturing allows for the point-by-point control of both the composition and microstructure of the core such that desired attributes are obtained in the completed proppant.

The proppant shell can be a dense, impermeable coating engineered to add both chemical and physical strength to the proppant. Additive proppant manufacturing allows the point-by-point control of both the composition and microstructure of the proppant shell. Crystalline reinforcing materials can be deposited and patterned to give maximum strengthening. These crystalline reinforcing materials can be, for example, in the form of high aspect ratio particles such as whiskers or flakes, or low aspect ratio particles any of which can include oxides, nitrides carbides, metals, vitreous materials, or combinations thereof. The outer surface of the proppant shell can be textured to optimize proppant lift and transport and to minimize flowback.

The proppant can include one or more coatings, for example, an outer coating. Additive manufacturing enables a point-by-point deposition process specifically engineered to optimize the interface between the proppant and the frac slurry. Whereas the proppant body and shell are generally substantially inorganic, the proppant outer coating can be substantially organic. The proppant outer coatings can be layered or textured such that various attributes become operational as a function of time. The phobicity and tackiness of the proppant can be time enabled to optimize both proppant transport and ultimate deposition. The time enabling can be in the form of layers, or patterns of enabling materials deposited on the proppant surface.

The green proppant can contain a green proppant core, a green proppant shell, a green proppant outer coating, or any combination thereof. The green proppant can contain a green proppant core and the at least one ceramic ink contain a first ceramic ink, which can be applied to form the proppant core. The green proppant can contain a green proppant shell and the at least one ceramic ink can contain a second ceramic ink, which can be applied to form the green proppant shell. The green proppant can contain a green proppant outer coating and the at least one ceramic ink can contain a third ceramic ink, and the third ceramic ink can be used to form the green proppant outer coating. A non-ceramic ink can be substituted for the third ceramic ink. At least two of the three ceramic inks can differ from each other in respect to chemical property and/or physical property. Additional ceramic inks, as well as non-ceramic inks, can be used.

At least one subtractive process can be performed on green proppants formed and/or proppants produced by the methods of the present invention. For example, the subtractive process can include milling, lathing, stamping, crushing, carving, etching, or any combination thereof.

The green proppant can be cured (dried) during and/or after printing or other additive formation. This curing can be distinct from any subsequent sintering of a layer or completed proppant. Curing can be omitted from techniques such as SLS where sintering takes place contemporaneously with the printing process. The curing of ceramic ink and/or support material can be carried out by temperature change and/or radical polymerization such as photopolymerization. The curing can take place in layers. Each drop of ceramic ink can be cured directly after it strikes the substrate or the preceding layer. Wax-containing ceramic inks can be cured by cooling and polymerization and wax-free ceramic inks by polymerization exclusively. Drops or layers can be illuminated parallel to the printing by light sources arranged to the side of the printheads, for example, by UV or blue light lamps.

After printing, the printed layers can be dried (cured) at a temperature of, for example, from about 60° C. to about 120° C. Each individual layer can be dried after application, but drying can be performed after any desired number of layer applications of ceramic ink. A fan can be used with application of reduced pressure or with convective flow to remove the vapor of any liquid associated with the ceramic ink. The drying of these layers can also be performed using irradiation with a halogen lamp, an infrared lamp, by means of ion radiation, laser radiation or using heating elements arranged in the printing region. For example, curing can be performed using a halogen lamp focused on the printing region by convex optical lenses. At the same time, a fan can be used to produce convection and thus accelerated drying. One or more heating units in thermal communication with printer stage can also be used for curing.

The green proppant can be dried and then collected for subsequent densification via sintering; or can be sintered directly without drying. Any desired method of sintering can be employed, for example, kiln processing (tunnel or rotary), laser processing, microwave processing, and any combination thereof. Sintering is a high-temperature process. During sintering, material rearrangement and grain growth processes can occur with individual ceramic particles moving towards one another and form a dense, solid and pore-free structure, for example by diffusion. The sintering procedure can lead to compaction of the proppants. The sintering of proppants can take place in a sintering oven or furnace, for example, at temperatures from about 1200° C. to about 1700° C., from about 1300° C. to about 1600° C., from about 1350° C. to about 1500° C., from about 500° C. to about 1200° C., from about 600° C. to about 1000° C., or from about 700° C. to about 900° C. The sintering time can be from about 2.0 hours to about 6.0 hours, or from about 4 hours to about 5.5 hours. Sintering can be conducted in a batch, intermittent, or continuous fashion. To help minimize shrinkage of the proppant during sintering, a flexible constraining layer can be applied to the unfired proppant. The constraining layer can contain finely divided particles of non-metallic inorganic solids dispersed in a volatilizable polymeric binder. After cooling, the constraining layer can be removed from the surface of the sintered proppant.

Debindering (removal of binding agents) and sintering can take place in a one-stage process, for example, at a temperature from about 50° C. to about 2,500° C., from about 20° C. to about 1600° C., or from about 20° C. to about 1,500° C. The duration of the one-stage thermal process can be from about 2.0 hours to about 12 hours, from about 4 hours to about 10 hours, or from about 6 hours to about 10 hours. Due to the debindering and sintering, the proppant can experience a volume contraction. This volume contraction can be taken into account in advance by oversizing the proppant to be printed to help maintain the accuracy of the debindered and sintered component.

Mechanical separation is the result of process equipment mechanically separating the formed composition from each other or a detachable substrate. An example of mechanical separation can be, for example, a doctor blade or air knife located on the side of the proppant formed to separate proppant from one another, for example along a perforation or scored line in material bridging individual proppants. Partially cured proppant can be at least partially coated with a metal oxide particulate to prevent them from sticking to one another during heating. If firing steps are performed at separate times, the proppant can be coated with metal oxide particulate after pre-firing but before the second firing step. For example, the quantity of metal oxide particulate used to at least partially coat the proppant can be from about 5.0 wt % about 10 wt % based on the total weight of the ceramic aggregate precursor particles. The average size of proppant can be reduced after at least partially curing and/or heating. This reduction can be performed using at least one of milling, crushing, or tumbling.

Another additive method for forming proppants is provided by the present invention. Elements of all additive methods described herein can generally be implemented in any described additive method. At least one ceramic ink can be applied to a printer stage to form a powder bed. At least a portion of the proppant bed can be sintered to produce a proppant. The powder bed can be formed in succeeding layers and the sintering can be performed after the formation of each layer. The printer stage can be lowered after sintering each layer. The sintering can be performed using an energy beam. The energy beam can include a laser beam, an electron beam, or any combination thereof. A binding agent can be applied to the powder bed. Unsintered ceramic ink can be removed from the powder bed. The powder bed can be fluidized.

An additive fabricator configured to produce proppants is provided by the present invention. The system can include a frame; a printer stage operatively associated with the frame; a printhead operatively associate with the frame, positionable above (greater than the height of) the printer stage, and configured to dispense at least one ceramic ink; and at least one actuator configured to move the printer stage and the printhead relative to one another. The at least one actuator can include a first actuator configured to generate movement along an x-axis, a second actuator configured to generate movement along a y-axis, and a third actuator configured to generate movement along a z-axis. The first actuator can be configured to move the printhead and second actuator can be configured to move the printer stage. The third actuator can be configured to move the printhead. The third actuator can be configured to move the printer stage. The at least one actuator can include an actuator configured to generate rotational movement. The printhead can include at least one extruder, at least one nozzle, or both. The at least one nozzle can be piezoelectrically controlled.

The additive fabricator can include at least one heater. The at least one heater can be in thermal communication with at least one of the printhead and the printer stage. The at least one heater can include a first heater in thermal communication with the printhead and a second heater in thermal communication with the printer stage. The additive fabricator can include at least one temperature sensor configured to measure a temperature associated with at least one of the printhead and the printer stage. The temperature sensor can include at least one of a thermistor, a thermocouple, or both. The temperature sensor can be used in a feedback system that can adjust or maintain a desired temperature using heaters and/or cooling elements such as a fan or heat sink.

The additive fabricator can include at least one power source in electrical communication with the at least one actuator. The additive fabricator can include at least one driver for driving the at least one actuator. The additive fabricator can include at least one sensor configured to sense the position of the printhead. The at least one sensor can include any desired type or number of sensor, for example, an optical sensor, an electrical sensor, a force-activated sensor, or any combination thereof. One or more cameras can be provided to sense the position of one or more elements of the additive fabricator, the position of proppants being formed, the level of completion of proppants being formed, or any combination thereof. A scale can be operatively associated with the printer stage to weigh proppants during or after production to determine degree of completion or if the proppants are within desired parameters.

The additive fabricator can include at least one container configured to hold the at least one ceramic ink and in fluid communication with the printhead. The container can be permanently attached or disposable. Different containers can contain same or different ceramic inks. The additive fabricator can include at least one energy source configured for curing the at least one deposited ceramic ink. For example, the at least one energy source can include ultraviolet radiation, visible light, infrared radiation, microwave radiation, or any combination thereof.

Any type of 3-D printing or other additive fabrication technique can be employed consistent with the present invention. The technique can be tailored based on the ceramic ink used. For example, the technique can be adjusted for wax-containing ceramic inks. Wax-containing ceramic inks can be printed, for example, at a temperature in the range of from about 40° C. to about 140° C., from about 60° C. to about 120° C., or from about 75° C. to about 110°

C., or from about 80° C. to about 100° C., for example as measured a printhead nozzle. After the ceramic ink contacts the printer stage or the already printed layers, the printed drops cure, as the wax portion contained in the slip solidifies. The temperature of the printer stage can be from about 20° C. to about 100° C., from about 20° C. to about 70° C., or from about 20° C. to about 40° C. The curing procedure can be controlled by the difference in temperature between printing temperature and temperature of the printer stage.

Both (1) drop-on-demand and (2) vibration of a continuous pressurized flow based techniques can be used in the present invention. Drop-on-demand (DOD) can produce a single droplet from an orifice for each impulse of an impulse applicator, for example, a piezoelectric crystal. In DOD printing, the ceramic ink is received in a cavity composed of a piezoelectric actuator and is compressed to eject ink droplets to a desired position of a predetermined substrate at a constant ejection rate, thereby forming a film or layer. The film can exhibit physical properties of a ceramic film without sintering at high temperature. Because inkjet printing can enable various shapes to be directly printed in response to digital signals, inkjet printing enables printing of a shape having a size of several dozen micrometers to a few square meters on various substrates. Inkjet printing can provide a ceramic film without sintering. A granulating method can be employed to form droplets from a ceramic ink using a continuous ink-jet method and drying the droplets. A granulating device can be used to form a discretional particle size distribution, support a wide variety of particle diameters, select a wide range of composition in a liquid material and improve productivity. A syringe tip assembly can be used for printing that includes a seal component configured to engage a syringe tip of the extrusion syringe, a nozzle configured to slidably engage with the seal component, and a biasing member configured to apply a biasing pressure between the seal component and the nozzle.

A continuous ink-jet method is an ejection method that the flow of an ink or the like which is converted a small droplet after ejected from the nozzle. A continuous ink-jet method can use a nozzle equipped with a piezoelectric element to inject ceramic ink, and the state of the liquid such as ink flow out from the nozzle can be controlled by applying a voltage of a constant frequency to the piezoelectric element. The piezoelectric element with superimposed voltage can apply fluctuating pressure corresponding to a predetermined frequency on the ceramic ink continuously flowing out of the ink-jet nozzle when it passes through the nozzle.

Single nozzles or multi-nozzles can be employed. One or more printheads for dispensing ceramic ink can be used. For example, at least two printheads (each having at least one nozzle), can each be supplied from at least two different reservoirs, allowing for printing with multiple ceramic inks. 1 to 100, 2 to 75, 3 to 60, 5 to 50, 10 to 25, or more than 100 printheads and/or nozzles can be used, which can be supplied with ceramic ink from one or more reservoirs. For example, a piezoelectric drop-on-demand multi-nozzle high-temperature printhead can be used in which the nozzles of can be controlled individually. The shape and number of drops can be controlled by different control parameters, such as temperature, stress, pulse progression and frequency. The frequency of the generation of drops can be directly linked to the feed rate of the printhead(s), with the result that a closed layer construction is achieved by placing many individual drops alongside one another. The resulting proppant can be influenced by the drop volume and its specific properties such as surface tension, wetting, viscosity, and polymerization properties. The layer thickness of an individual layer can be varied by overlaying printing of the individual drops. The efficiency and resolution of the printing process can additionally be increased through the use of several multi-nozzle printheads that are jointly fed from a reservoir. The printing of the support material can be accomplished with one or two further printheads that are supplied from one or more additional reservoirs.

Inkjet printing of ceramic ink can include loading a reservoir of ceramic ink in one or more containers, heating the ceramic ink to melt the ceramic ink in the containers, and ejecting the molten forming materials from the containers and through one or more adjustable planar nozzles. In conjunction with the ejecting step, the size of planar nozzles can be adjusted to form variable size planar jets of molten ceramic ink flowing towards the substrate, the printer stage can be positioned beneath the planar jets, and the ceramic ink deposited in layers on the printer stage to form the proppant. Nozzles can be agitated before and/or during printing. Ceramic ink can be passed through a screen or filter of appropriate mesh size to minimize clogging of nozzles.

The ceramic ink can be atomized. The ceramic ink can be held in a container and then positioned adjacent an opening in the container. Impulses can be repeatedly applied to the ceramic ink in the direction of the opening with a frequency of at least 10 Hz, the impulses being sufficient to impel the ceramic ink through the opening as elongate discrete fluid segments. Impulses applied by the impulse applicator are periodic in character and such that a discontinuous force applied to the ceramic ink at the nozzle in the direction of flow creates a flow of elongate discrete fluid segments of material through the openings. The frequency of such impulses can be varied over a wide range. This procedure enables the pushing action through the nozzle to be performed impulse by impulse to achieve formation of a flow of elongate discrete fluid segments formed at the exit end of the nozzle. The time between each impulse is a function of the period of the oscillation and can be adjusted as desired. A distinct mass flux of droplets can be engineered by arrangement of various numbers of openings in different geometric patterns and sizes in the nozzle. When two or more ink-jet nozzles are used, by controlling the eject function for each ink-jet nozzle according to a discretional shape and/or components of the droplet, the proppants with a desired blending quantity can be produced simultaneously, even if the particle diameter and/or components are different. The proppants with a desired blending ratio or particle size distribution can be made all at once because a discretional particle diameter and particle size distribution can be realized.

The size of the ceramic ink droplet formed can be controlled by the viscosity of the ceramic ink supply and the drive frequency of the piezoelectric element. In a continuous ink-jet method, there is little restriction on the diameter of the ink-jet nozzle as compared with the piezoelectric method forming the droplet at the discharge step, and a wide range of nozzle diameters can be used. The speed of the ceramic ink flow from the ink-jet nozzle is controlled according to the particular ceramic ink used in order to obtain a predetermined speed. That is, by controlling the diameter of the ink-jet nozzle, the viscosity of the ceramic ink and the supply speed of the ceramic ink to be supplied into the ink-jet nozzle, the ceramic ink can be flowed at a constant speed. The condition of flow can be also controlled for each ink-jet nozzle to form a different droplet for each ink-jet nozzle according to the component and/or shape of the droplet which is formed after ejected from each ink-jet nozzle. By controlling the condition of flow by changing the factor of droplet formation in each ink-jet nozzle such as nozzle diameter, a voltage applied to the piezoelectric element, a drive frequency of the piezoelectric element, or any combination thereof, proppants with a discretional particle size distribution can be produced.

A deflection voltage can be applied to the droplets so that the droplets separated from the ceramic ink and formed after being flowed from the inkjet nozzle are directed toward a predetermined advance direction, the advance direction of the droplets can be easily adjusted and the droplets can be carried into the drying part more accurately. The ceramic ink can emerge through a plurality of openings, for example nozzle orifices, arranged in one or more desired configurations, for example, circles arranged concentrically within one another, at same, similar, or different volumetric flows, and is turned into droplets as the nozzle plate is caused to vibrate periodically. This process can result in a droplet wall with a desired geometry. A reaction gas can be applied to the drops of ceramic ink in free fall. The droplets can be enveloped by and exposed on all sides to a reaction gas which is delivered from inside the envelope and extracted outside the envelope, extraction occurring between the gas inlet and the nozzles. A gas delivery device delivering the reaction gas can be arranged inside the reaction free-fall section, inside or outside an envelope formed by apparent attachment of the falling droplets. An extraction device extracting reaction gas can be arranged outside or inside the envelope, and directed onto the falling droplets tangentially to and in the same direction as the direction in which the droplets are falling.

The nozzles of the printing head can be cleaned after printing of one or more layers by any suitable method. For example, a cleaning liquid containing water, a low molecular weight alcohol and/or a polyhydric alcohol can be used. For example, the cleaning can be a mixture of water, ethanol and at least one polyhydric alcohol in a weight ratio of water:ethanol:polyhydric alcohol of 6-10:1-4:1-3, for example, 8:1:1. The cleaning of the nozzles of the printing head can be carried out in such a way that the cleaning liquid penetrates into the nozzles and the antechambers of the nozzles. This penetration of the cleaning liquid into the nozzles and the antechambers of the nozzles can be achieved by using elevated external pressure or subatmospheric pressure in the printing cartridge containing the suspension. This pressure can be achieved, for example, by the internal pressure of the gas phase of the printing cartridges being set to a value that is below atmospheric pressure. The cleaning of the nozzles of the printing head can be carried using an element that is impregnated with the cleaning liquid and is periodically wiped over the cleaning head in the region of the nozzles under a contact pressure. This element can be an open-pored foam or a microfiber cloth or even a combination thereof, for example, an open-pored foam over which a microfiber cloth is stretched. Nozzles can also be cleaned using ultrasound, for example, between the pressure cycles in the printing cartridge or at the printing head. An ultrasonic bath can be used that contains cleaning liquid into which the printing nozzles of the printing head can be lowered. The ultrasonic bath can be located in the region of the park position of the printing head. A wiping roller can be used to remove excess cleaning liquid between the point where the foam cylinder leaves the cleaning liquid and the point at which it contacts the pressure head of the inkjet printer.

A digital thermal transfer printer can be used. A thermal transfer printer is a machine that creates an image by melting ceramic ink from a film ribbon and transferring it at selective locations onto a receiving material. Such a printer can include a printhead having a plurality of heating elements that can be arranged in a desired pattern. The heating elements can be operated selectively. An automated process utilizing a high pressure extruder head, which can be mechanically controlled, is utilized to extrude a continuous filament onto a surface, which may be mechanically controlled, to form proppants. A computer-controlled high-pressure extrusion head with a 4-axis computer numerically controlled (CNC) motorized stage can enable extrusion and deposition of components.

Proppants can be formed from laminations by fabricating a plurality of first sheets of a first material composition, cutting each of the first sheets to form a contoured layer representing a cross-section of the proppant with the remaining portions of the sheets discarded. The contoured layers can be stacked in a desired sequence to form a stack of contoured layers that can then be laminated. Subsequently, the contoured layers of the stack can be secured to each other to form the integral proppant. A second type of sheet made of a temporary support material can also be cut to form a contoured layer representing a void in a cross-section of the proppant to be formed. The contoured layers of the second sheets are then stacked along with the contoured layers of the first sheets to form the proppant. The laminated stack of contoured layers is then sintered. During processing, support material can be removed, leaving voids in the proppant.

An apparatus and method for forming a proppant by planar deposition of ceramic ink can include containers for holding molten ceramic ink, mechanical piston or screw members in the containers for pressurizing the molten ceramic ink in each of the containers, and an adjustable planar nozzle mechanism coupled to the containers through which the pressurized molten ceramic ink can flow to form variable width planar jets that are deposited in layers onto a moveable printer stage or previously applied layers to form the proppant. The adjustable planar nozzle mechanism can include cooperating position controllable plates for forming a variable width planar nozzle opening. The edges of the planar nozzle opening can be non-parallel at the ends of the nozzle opening to ensure uniform thickness of the deposited planar jets.

Printing of ceramic inks to form proppants can be carried out by xerography, ink jet printing, silk screen printing, lithographic printing, soft lithography, and the like. For example, a layer can be transferred from a digital thermal transfer printer to a transfer member from which the layer is transferred to a printer stage or already deposited layers. Such transfer members can include image receiving pads or belts or decals. A thermal transfer assembly can include a thermal transfer ribbon and a covercoated transfer sheet. The thermal transfer ribbon can include a support and a ceramic ink layer.

Proppants can be formed by screen printing desired shapes from a ceramic ink onto a surface, drying the screen-printed shapes so obtained and firing them to generate the proppant. A suitable perforated substrate can be a material with one or more orifices that has sufficient strength to allow a composition to be passed through the orifice(s) without rupturing the perforated substrate. In general, perforated substrates can include, for example, mesh screens as described, for example, in U.S. Pat. No. 5,090,968, film dies, spinneret dies, sieve webs as described, for example, in U.S. Pat. No. 4,393,021, or screens as described, for example, in U.S. Pat. No. 4,773,599, all of which are incorporated by reference herein in their entireties. Perforated substrates can have any desired geometry as can the perforations (orifices). The screen can be made from any suitable material such as stainless steel, plastic such as PTFE, EVA, polyester or nylon, heavy duty paper and the like. The shape of the apertures in the screen can be selected according to the proppants desired. These shapes of the proppants thus formed can be angular or round or regular rectangular shapes with an aspect ratio, that is the ratio of length to the greatest cross-sectional dimension, of from about 2:1 to about 50:1 and preferably from about 5:1 to about 25:1. If the thickness is too great the dispersion is not readily released from the apertures when the screen is removed. This limitation can be addressed by treating the screen with release agents such as silicones, fluorocarbons, or hydrocarbon derivatives. The aperture screen can be coated, for example, using a baked-on fluoropolymer such as TEFLON. The coating can be sprayed on before use, for example using organic lubricants such as octanol, decane, hexadecane, and the like.

A proppant can be generated by a layered construction through a controlled shift in the position of the printhead(s) relative to the substrate in the spatial directions x and y and, after completion of the respective x-y plane, in the z direction. If the chemical composition of the individual layers printed on top of each other is varied, a spatial gradient is produced in the chemical composition. Accordingly, proppants can be gradient (graded). The composition, structure, and/or texture can change gradually over the volume of the proppant, which involves corresponding changes in the material properties. Gradient materials are also called graded materials or FGMs (functionally graded materials). A functional grading results from the targeted construction of a proppant by two or more materials. Material pairings include, for example, ceramic-metal, ceramic-ceramic and ceramic-glass.

One or more types of ceramic inks can be used to prepare the proppant. Ceramic inks can be applied simultaneously, alternatingly, or successively. The relative proportions of different ceramic inks can be dependent on position, resulting in the relative proportion of ceramic inks varying along at least one direction in the layer plane in a predeterminable manner. The relative proportion of ceramic inks can remain constant or vary from one layer to the next, allowing for compositional variation in three coordinates. In addition to layers with varying composition, the proppants can also contain layers with homogeneous composition, achieved, for example, by using a single type of ceramic ink.

The additive fabricator can include a microcontroller configured to control the at least one actuator, the printer stage, the printhead, or any combination thereof. Software designed to run on microcontroller of additive fabricator is also provided by the present invention. A system for additively producing proppants is provided by the present invention. For example, the system can include an additive fabricator configured to form green proppants and an oven configured to sinter the green proppants. The system can include a computer in operative communication with at least one of the additive fabricator and the oven, and be configured to send instructions to, receive data from, or both, at least one of the additive fabricator and the oven.

A proppant additive formation system can have a tool chain including one or more of a 3-D model, a slicer, a printer control, firmware, and associated electronics. The slicer cuts the 3-D model into virtual slices corresponding to the layers to be printed. These virtual slices generate a tool path that instructs the extruder, printhead, laser, electron gun, or other positionable element in the printer where to move and when to release ceramic ink. The set of commands generated by slicer can be referred to as G-code or equivalent code. The model can be an image of an actual, physical proppant, or a virtual model generated using CAD or an analogous drafting program. The virtual model or code can be provided in a 3-D file format, for example, STL, Collada, OBJ, X3D, or VRML2. Printer control is a host software application that serves as a hub from which the printer is operated. From the printer control, the slicer can be launched, movement of the printer (printhead, printer stage, and the like) can be controlled, temperature can be controlled (of the ceramic ink, printhead, printer stage, and the like), and print jobs can be started, paused, or terminated. The printer control processes the code and communicates with the printer electronics to carry out a print job. Firmware controls the electronics of the printer based on instructions received from the printer control. The firmware also can send data back to the printer control including, for example, temperature data and the position of the proppant being formed. Electronic hardware can include various components such as a power supply, microcontroller, a main board, printhead drivers, heating elements, temperature sensors, motor drivers, stepper motors that control movement of the printhead and/or printer stage, lasers, and cameras for positioning feedback. A description of such elements is provided in Evans, Practical 3D Printers, Apress, 2012.

Another additive fabricator configured to produce proppants is provided by the present invention. Any element from one additive fabricator can generally be used in any other described additive fabricator. The same also applies true between ceramic inks, methods, fabricators, systems, and the like described herein. The additive fabricator can include a frame, a printer stage operatively associated with the frame, a powder bed positioned on the printer stage and configured to hold at least one ceramic ink, an energy beam source operatively associated with the frame and positionable above the printer stage; and at least one actuator configured to move the energy beam source and the printer stage relative to one another. The additive fabricator can include a supply container configured to hold the at least one ceramic ink and in fluid and supply the powder bed. The energy beam source can be configured to emit a laser beam, an electron beam, or any combination thereof. The additive fabricator can include a gas source configured to supply gas to and fluidize the at least one ceramic ink when positioned in the powder bed. The additive fabricator can also be part of a system that further includes a computer in operative communication with the additive fabricator and configured to send instructions to, receive data from, or both, the additive fabricator. Software for running such fabricators and systems are also provided or software known in the art can be employed.

Some additive methods melt or soften material to produce layers, for example, selective laser sintering (SLS) and fused deposition modeling (FDM). Some additive methods cure liquid materials using various technologies such as stereolithography (SLA). Laminated object manufacturing (LOM) cuts thin layers to shape and joins them together. SLS involves the use of a high power laser (for example, a carbon dioxide laser) to fuse small particles of plastic, metal (direct metal laser sintering), ceramic, or glass powders into a mass that has a desired 3-D shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed. Because finished part density generally depends on peak laser power, rather than laser duration, a SLS machine typically uses a pulsed laser. The SLS machine can preheat the bulk powder material in a powder bed somewhere below its melting point, to make it easier for the laser to raise the temperature of selected regions the rest of the way to the melting point. Unlike some other additive manufacturing processes, such as stereolithography (SLA) and fused deposition modeling (FDM), SLS does not require support structures due to the fact that the part being constructed is surrounded by unsintered powder, allowing for formation of a wide range of geometries. The apparatus used in SLS can include a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

Solid freeform fabrication (SFF) generally refers to the manufacture of articles in a layer-wise fashion directly from computer-aided-design (CAD) databases in an automated fashion, as opposed to conventional machining of articles from engineering drawings. One example of an SFF technology is the SLS process. Systems for performing SLS, for example, the VANGUARD system, are available from 3D Systems, Inc. (Valencia, Calif.). Articles can be produced in layer-wise fashion from a laser-fusible powder that is dispensed one layer at a time. The powder is fused, or sintered, by the application of laser energy that is directed to those portions of the powder corresponding to a cross-section of the article. After the fusing of powder in each layer, an additional layer of powder is then dispensed, and the process repeated, with fused portions of later layers fusing to fused portions of previous layers (as appropriate for the article), until the article is complete. Detailed description of the selective laser sintering technology is described in U.S. Pat. Nos. 4,247,508; 4,863,538; and 5,017,753, which are incorporated by reference herein in their entireties. Examples of composite powder materials are described in U.S. Pat. Nos. 4,944,817; 5,076,869; and 5,296,062, which are incorporated by reference herein in their entireties.

A related SFF technology is described in U.S. Pat. Nos. 5,340,656 and 5,387,380, which are incorporated by reference herein in their entireties. From a computer (CAD) model of the desired part, a slicing algorithm draws detailed information for every layer. Each layer begins with a thin distribution of powder spread over the surface of a powder bed. Using a technology similar to ink-jet printing, a binder material selectively joins particles where the object is to be formed. A piston that supports the powder bed and the part-in-progress lowers so that the next powder layer can be spread and selectively joined. This layer-by-layer process repeats until the part is completed. Following a heat treatment, unbound powder is removed, leaving the fabricated part.

The proppant can be built up in a layer-wise fashion, by dispensing a thin layer of ceramic ink powder over a target surface, preferably in a controlled environment, and then applying laser energy to selected locations of the powder layer to fuse, or sinter, the powder thereat. If the ceramic ink contains a polymeric binding agent, the ceramic particles can be fused to one another by the melting and cooling of the polymer binding agent, rather than by sintering. The selected locations of the powder layer correspond to those portions of the layer in which the article is to be formed, as defined by a computer-aided-design (CAD) data base representation of the article. After the selective fusing of a layer, a subsequent layer is disposed over the previously processed layer, and the selective fusing is repeated in the new layer at locations of the layer corresponding to a CAD slice of the proppant being formed. Those portions of a layer that overlie fused portions of the powder in the prior layer are bonded to the fused portions in the prior layer, such that a proppant is formed. The unfused powder in each layer serves as a support medium for subsequent layers, enabling the formation of overhanging elements in the article. SLS parameters include such items as the laser power, laser scan rate, ambient chamber temperature, layer thickness and the like. The values of these operating parameters can be optimized for a particular ceramic ink. Other thermal-based additive processes can alternatively be used to form the green proppant. For example, a proppant can be formed by the layer-wise masked exposure of ceramic ink to light, so that the portions of the ceramic powder in the ink to be fused are exposed to the light and the unfused portions are masked therefrom.

Unfused or unsintered powder can be removed from the proppant as well as the area surrounding the green proppant. This removal can involve the mechanical removal of unfused powder to yield the proppant. Further surface finishing of the green proppant can be performed at this time. The proppant can then be placed in an oven or furnace, and can be packed in inert powder packing made up of alumina or silica powders to provide support during the subsequent heating steps. A lower melting infiltrant material is placed in the oven or furnace in contact with the green article. The temperature of the oven or furnace can be slowly raised to a first temperature high enough to begin to decompose the polymer binders present. At these temperatures any metal hydrides present also begin to break down and release hydrogen gas in the immediate environment of the decomposing polymers, the resulting reducing atmosphere accelerating the breakdown of the polymer fragments into smaller fragments. This simultaneous breakdown of polymers and release of hydrogen leads to a much more complete removal of residual carbon from the article skeleton, thereby reducing the likelihood of a later problem in these types of systems such as blistering. The temperature of the oven or furnace can then be raised to increase the temperature of the article further to begin sintering of the proppants. The temperature of the oven or furnace can be further increased to allow an infiltrant placed in the oven or furnace to melt and infiltrate the proppant.

For techniques such as SLS, ceramic ink can either be pre-applied in a layer, preapplied in a pattern dictated by the computer program for forming the proppant, or co-applied with the application of a binding agent and/or energy source. Electrophotographic powder deposition techniques can also be employed. Ceramic ink powder can be contained in a powder bed on the printer stage. The powder bed can be stationary or fluidized. A powder bed can be built up by repeated deposition of a ceramic ink that contains powder. Layers can be made by depositing a liquid dispersion of the desired powdered material, which then slip-casts into the forming powder bed to make a new layer. The ceramic ink can be deposited in any suitable manner, such as by raster or vector scanning, or by a plurality of simultaneous jets that coalesce before the liquid slip-casts into the bed, or by individual drops, the deposits of which are individually controlled, thereby generating a regular surface for each layer.

A binding agent solution can be printed onto a ceramic powder-bed layer, binding together the powder particles, and fixing them in position. Repeated application of additional powder layers and subsequent printing of the binder into the powder layer, generates a green proppant. The green proppant can then be debindered and sintered. During the debindering organic binding agents are pyrolized. The process parameters of the debindering and sintering can be based on the binding agent and on the ceramic material. A proppant shell and one or more outer coating can be applied before and/or after debindering and/or sintering of a proppant core.

A laser or an electron gun can be directed at a fusible powder in a fluidized bed. The beam melts the powder and the melted powder fuses and solidifies on a surface to form the shape of the proppant. The particles in powder can be mixtures of plastics, metals, and/or ceramics. For example, a mixture of metal particles and ceramic particles could be used. If mixtures of different particles are used, care should be taken to use particles that do not separate within the fluidized bed. This can be accomplished by using particles with similar densities or by adjusting the shape of particles of different densities so that they are suspended equally by the gas flow within the fluidized bed. An apparatus of the present invention can include a fluidized bed containing a fluidized powder, a surface within the bed on which the shape is cast, an electron beam or laser directed at the surface, which has an energy sufficient to fuse the powder, means for controlling the level of the powder in the fluidized bed relative to the surface, and means for controlling the horizontal position of the surface relative to the beam.

The binding agent used can include a resin composition that can be cured or hardened with heat, ultra violet light, electron beam, ion beam, plasma, microwave, X-ray, Gamma ray, or a combination thereof. The binding agent can contain a lower-melting material that can be readily fused to become a fluid. Once permeating through a powder layer for providing bridges between particles, the binding can be cooled down and solidified. The steps of applying energy can be carried out in such a manner that successive layers are affixed together to form a unitary body of the proppant. The binding agent can be provided sufficient time to permeate through the current layer of the ceramic ink powder and reaching the top surface of the previously deposited layer.

For electrophotographic powder deposition techniques, a range of electrostatic printer or photocopier mechanisms can be employed. For example, electrophotographic powder deposition means can include, planar capacitor dot matrix charging device and/or combined corona discharging/thin photoconductive charge receptor/scanning laser imaging devices. The electrophotographic powder deposition technique can provide a 2-D pattern or "latent image" of electrostatic charges to attract fine powder particles of the binder composition and/or modifiers to form these binder/modifier particles into a toner "image" (thin section of powder particles) in selected areas of a powder layer; these areas being programmable and predetermined by a computer. These areas, corresponding to the positive region of a layer, are defined by the layer data of a CAD design for the object to be built. A full area of the binder powder and/or modifier powder can be formed and transferred to deposit onto a layer of body-building powder material, corresponding to a process of "photo-printing." The binder powder "photo-printed" to the positive region of a body-building powder material layer will help sinter the particles therein, forming a cross-section of the 3-D object. The modifier powder image transferred to the same region of a layer will impart desired physical properties to this layer. The primary body-building powder particles in other areas of the same layer, not receiving any binder powder composition, will remain as isolated, loose particles that serve as part of a support structure. A layer of powder can be preheated to a temperature above the melting point of the binder powder. This preheating can be done so that the binder powder, when transferred and deposited onto the predetermined areas (positive region) of a corresponding pre-heated body-building material powder layer, can be quickly melted to become a fluid that permeates through the gaps between fine particles of the body-building material powder. This binder fluid, when solidified, can bond and consolidate the powder particles in the positive region, leaving the powder particles in the negative region un-bonded (free from binder). The particles in the negative region stay as part of a support structure.

As opposed to the case of SLS in which a laser beam is used to sinter the powder spot by spot (essentially point by point), electrophotographic techniques can build area by area (up to one full layer at a time). The binder powder, once deposited, is melted in such a manner that the binder fluid flows around to provide a bridge between primary body-building particles in the positive region. The binder can bond together these particles to impart sufficient strength and rigidity to the layer for easy handling and for maintaining the part dimensional accuracy during the formation of subsequent layers. If the binder contains a photo-curable adhesive composition, the pre-heat energy intensity and the energy of the imposing light source (heat and light constituting the energy means) should be provided in such a fashion that successive layers can be affixed together to form a unitary body of the proppant. If the binding agent contains a heat-fusible material composition, a complete body-building powder layer can be pre-heated by other heat sources disposed near the object-building zone to a temperature sufficient for melting the binding agent.

After a selected duration of time, this heat source can be turned off to enable solidification of the binding agent. If the layer of ceramic material is already mixed with component compositions of binding agents, the electro-photographic powder deposition means can be used to transfer an image of the photo-initiator powder to the positive region of the layer. The pre-heat temperature can be chosen so that it is capable of promoting the curing reaction once initiated by the photo-initiator along with an incident light, but insufficient for initiating the curing reaction of the binder compositions by the pre-heat alone.

A 3-D printer can be used to build a proppant from cross-sectional layers of the proppant that are formed on one surface, then subsequently adhered to the stack of previously formed and adhered layers. For example, the 3-D printer can include a first surface adapted to receive a bulk layer of sinterable powder as the ceramic ink, a radiant energy source adapted to fuse a select portion of the layer of sinterable powder to form a sintered image; and a transfer mechanism adapted to concurrently transfer or print the sintered image from the first surface to the object being assembled while fusing the sintered image to the object being assembled. The layer of sinterable powder can be fused on a roller or drum, for example, with the energy provided by an incoherent heat source such as a halogen lamp. The transfer mechanism includes one or more actuators and associated controls adapted to simultaneously roll and translate the drum across the object being assembled so as to press and fuse the sintered image to the object. The transfer mechanism may further include a transfixing heater for heating the sintered image and the object immediately before the layer is applied to the object. The process of generating an image and transferring it to the object being assembled can be repeated to form the proppant.

The printer can include a powder applicator adapted to apply a predetermined quantity of sinterable powder to the drum for sintering. The applicator extracts the sinterable powder from a reservoir and permits the powder to briefly free fall, thereby separating the particles that may have compacted in the reservoir and normalizing the density of the particles applied in layer form to the drum. The powder applicator can further include a blade which, when placed a select distance from and angle relative to the drum, produces a layer of sinterable powder with uniform thickness and density on the drum as the drum is rotated.

A printer drum can include a temperature regulator and drum heating element adapted to heat the temperature of the drum at or near the fusing point of the sinterable powder to reduce the energy used by the radiant energy source to print a sintered image from the layer of bulk powder on the drum. The printer can include additional heating elements. The printer can include a layer thickness control processor adapted to regulate the thickness of a sintered image fused to the object being assembled. The layer thickness control processor can vary the thickness of the sintered image before or after transferring to the object being assembled by, for example, varying the quantity of sinterable powder dispensed by the applicator, regulating the position of an applicator blade with respect to the drum, regulating the time and pressure applied by the drum to transfer the sintered image to the object being assembled, compressing the sintered image after it is fused to the proppant being assembled, and removing excess material from the proppant.

A ceramic body suitable for use as a proppant can be manufactured to have a number of specific attributes. For example, a low density allows for deep transport into a fracture. Sufficient strength allows the proppant to withstand closure pressure. Size and shape of the proppant allow it to fulfill targeted functions such as good proppant transport into the fracture. The proppant can be manufactured to allow it to settle with a porous packing and a stable microstructure that keeps the proppant network locked in place during subsequent pumping cycles. Some of these attributes can be engineered into the proppant body, while some can be engineered onto the surface of the proppant body. As described herein, additive proppant manufacturing enables a point by point optimization of both the bulk and surface properties of the proppant. Additive proppant manufacturing can be used to produce the entire proppant, to deposit a shell, or outer coating, on a preformed template, or deposit a specifically textured coating with specific localized chemical attributes on a conventionally or digitally manufactured proppant body. The inks, methods, fabricators, and systems described herein are suitable for digital manufacturing proppants including a proppant core, a proppant shell, and/or a proppant coating.

The present invention includes the following aspects/embodiments/features in any order and/or in any combination:

1. A ceramic ink formulated for additive formation of proppants, the ceramic ink comprising at least one ceramic material and at least one binding agent.
2. The ceramic ink of any preceding or following embodiment/feature/aspect, wherein the ceramic ink comprises a dispersion, suspension, solution, colloid, sol, gel, paste, powder, solid, a tape, a film, or any combination thereof.
3. The ceramic ink of any preceding or following embodiment/feature/aspect, wherein the ceramic material comprises a metal oxide, a metal oxide, a metal carbide, or any combination thereof.
4. The ceramic ink any preceding or following embodiment/feature/aspect, wherein the binding agent comprises a polymerizable monomer, a polymer, a resin, a wax, or any combination thereof.
5. The ceramic ink of any preceding or following embodiment/feature/aspect further comprising at least one solvent.
6. The ceramic ink of any preceding or following embodiment/feature/aspect further comprising a stabilizing agent, a polymerization initiator, a plasticizer, a dispersing agent, a viscosity agent, a tackifier, a metal hydride, or any combination thereof.
7. The ceramic ink of any preceding or following embodiment/feature/aspect, wherein the at least one ceramic material comprises at least 25 wt % of the total weight of the ceramic ink.
8. The ceramic ink of any preceding or following embodiment/feature/aspect, wherein the at least one ceramic material comprises at least 50 wt % of the total weight of the ceramic ink.
9. The ceramic ink of any preceding or following embodiment/feature/aspect, wherein the at least one ceramic material comprises at least 75 wt % of the total weight of the ceramic ink.
10. The ceramic ink of any preceding or following embodiment/feature/aspect, wherein the ceramic ink has a viscosity of from about 5.0 mPas to about 500 mPas.
11. A method of manufacturing the ceramic ink of any preceding or following embodiment/feature/aspect, comprising mixing the at least one ceramic material with the at least one binding agent.
12. An ink system formulated for additive formation of proppants, the ink system comprising at least two ceramic inks differing in respect to chemical composition, at least one physical property, or both.
13. The ink system of any preceding or following embodiment/feature/aspect, comprising a first ink comprising at least one ceramic material and a second ink comprising at least one binding agent.
14. An additive method for forming proppants comprising:
applying at least one ceramic ink to a printer stage to form a green proppant; and
sintering the green proppant to produce a proppant.
15. The method of any preceding or following embodiment/feature/aspect, wherein the ceramic ink is applied drop-wise, linearly, in a planar fashion, or any combination thereof.
16. The method of any preceding or following embodiment/feature/aspect, further comprising forming at least one layer of the green proppant from the application of the at least one ceramic ink.
17. The method of any preceding or following embodiment/feature/aspect, further comprising lowering the printer stage after forming the at least one layer and before applying a subsequent layer.
18. The method of any preceding or following embodiment/feature/aspect, further comprising curing the at least one layer after formation of the layer and before formation of a subsequent layer.
19. The method of any preceding or following embodiment/feature/aspect, wherein the ceramic ink comprises at least one binding agent.

20. The method of any preceding or following embodiment/feature/aspect, wherein the at least one binding agent comprises at least one monomer and further comprises at least one polymerization initiator.

21. The method of any preceding or following embodiment/feature/aspect, further comprising debindering the green proppant.

22. The method of any preceding or following embodiment/feature/aspect, further comprising applying energy to the applied ceramic ink to generate polymerization.

23. The method of any preceding or following embodiment/feature/aspect, further comprising flowing the ceramic ink through a printhead.

24. The method of any preceding or following embodiment/feature/aspect, wherein the printhead comprises at least one nozzle, at least one extruder, at least one screen, or any combination thereof.

25. The method of any preceding or following embodiment/feature/aspect, further comprising heating the printer stage, the printhead, or both.

26. The method of any preceding or following embodiment/feature/aspect, further comprising applying at least one support material to the printer stage.

27. The method of any preceding or following embodiment/feature/aspect, further comprising removing the support material after forming the green proppant.

28. The method of any preceding or following embodiment/feature/aspect, wherein at least two ceramic inks differing from one another are applied.

29. The method of any preceding or following embodiment/feature/aspect, wherein the at least two ceramic inks comprise a first ink comprising ceramic material and a second ink comprising a binding agent, and the first ink is applied before applying the second ink.

30. The method of any preceding or following embodiment/feature/aspect, wherein the application of the first and second inks are repeated multiple times to form the green proppant.

31. The method of any preceding or following embodiment/feature/aspect, wherein the at least two ceramic inks comprise a first ink comprising a first ceramic material and a second ink comprising a second ceramic material differing in chemical composition from the first ceramic material.

32. The method of any preceding or following embodiment/feature/aspect, wherein the proppant comprises a proppant core, a proppant shell, a proppant outer coating or any combination thereof.

33. The method of any preceding or following embodiment/feature/aspect, wherein the green proppant comprises a green proppant core, a green proppant shell, a green proppant outer coating, or any combination thereof.

34. The method of claim any preceding or following embodiment/feature/aspect, wherein the green proppant comprises the green proppant core, the at least one ceramic ink comprises a first ceramic ink, and the first ceramic ink is applied to form the proppant core.

35. The method of any preceding or following embodiment/feature/aspect, wherein the green proppant further comprises the green proppant shell, the at least one ceramic ink comprises a second ceramic ink, the second ceramic ink is applied to form the green proppant shell.

36. The method of any preceding or following embodiment/feature/aspect, wherein the green proppant further comprises the green proppant outer coating, the at least one ceramic ink comprises a third ceramic ink, and the third ceramic ink is used to form the green proppant outer coating.

37. The method of any preceding or following embodiment/feature/aspect, wherein at least two of the three ceramic inks differ from each other in respect to chemical property and/or physical property.

38. The method of any preceding or following embodiment/feature/aspect, further comprising at least one subtractive process.

39. The method of claim any preceding or following embodiment/feature/aspect, wherein the subtractive process comprises milling, lathing, stamping, crushing, etching, carving, or any combination thereof.

40. The method of any preceding or following embodiment/feature/aspect, wherein the printer stage comprises at least one mold configured to at least partially shape the proppant.

41. An additive method for forming proppants comprising:
applying at least one ceramic ink to a printer stage to form a powder bed; and
sintering at least a portion of the proppant bed to produce a proppant.

42. The method of any preceding or following embodiment/feature/aspect, wherein the powder bed is formed in succeeding layers and the sintering is performed after the formation of each layer.

43. The method of any preceding or following embodiment/feature/aspect, further comprising lowering the printer stage after sintering each layer.

44. The method of any preceding or following embodiment/feature/aspect, wherein the sintering is performed using an energy beam.

45. The method of any preceding or following embodiment/feature/aspect, wherein the energy beam comprises a laser beam, an electron beam, or any combination thereof.

46. The method of any preceding or following embodiment/feature/aspect, further comprising applying a binding agent to the powder bed.

47. The method of any preceding or following embodiment/feature/aspect, further comprising removing unsintered ceramic ink from the powder bed.

48. The method of any preceding or following embodiment/feature/aspect, further comprising fluidizing the powder bed.

49. An additive fabricator configured to produce proppants, the fabricator comprising:
a frame;
a printer stage operatively associated with the frame;
a printhead operatively associate with the frame, positionable above the printer stage, and configured to dispense at least one ceramic ink; and
at least one actuator configured to move the printer stage and the printhead relative to one another.

50. The additive fabricator of any preceding or following embodiment/feature/aspect, wherein the at least one actuator comprises a first actuator configured to generate movement along an x-axis, a second actuator configured to generate movement along a y-axis, and a third actuator configured to generate movement along a z-axis.

51. The additive fabricator of any preceding or following embodiment/feature/aspect, wherein the first actuator is configured to move the printhead and second actuator is configured to move the printer stage.

52. The additive fabricator of any preceding or following embodiment/feature/aspect, wherein the third actuator is configured to move the printhead.

53. The additive fabricator of any preceding or following embodiment/feature/aspect, wherein the third actuator is configured to move the printer stage.

54. The additive fabricator of any preceding or following embodiment/feature/aspect, wherein the at least one actuator comprises an actuator configured to generate rotational movement.

55. The additive fabricator of any preceding or following embodiment/feature/aspect, wherein the printhead comprises at least one extruder, at least one nozzle, or both.

56. The additive fabricator of any preceding or following embodiment/feature/aspect, wherein the at least one nozzle is piezoelectrically controlled.

57. The additive fabricator of any preceding or following embodiment/feature/aspect, further comprising at least one heater in thermal communication with at least one of the printhead and the printer stage.

58. The additive fabricator of any preceding or following embodiment/feature/aspect, wherein the at least one heater comprises a first heater in thermal communication with the printhead and a second heater in thermal communication with the printer stage.

59. The additive fabricator of any preceding or following embodiment/feature/aspect, further comprising at least one temperature sensor configured to measure a temperature associated with at least one of the printhead and the printer stage.

60. The additive fabricator of any preceding or following embodiment/feature/aspect, wherein the temperature sensor comprises at least one of a thermistor, a thermocouple, or both.

61. The additive fabricator of any preceding or following embodiment/feature/aspect, further comprising at least one power source in electrical communication with the at least one actuator.

62. The additive fabricator of any preceding or following embodiment/feature/aspect, further comprising at least one driver for driving the at least one actuator.

63. The additive fabricator of any preceding or following embodiment/feature/aspect, further comprising at least one sensor configured to sense the position of the printhead.

64. The additive fabricator of any preceding or following embodiment/feature/aspect, further comprising at least one container configured to hold the at least one ceramic ink and in fluid communication with the printhead.

65. The additive fabricator of any preceding or following embodiment/feature/aspect, further comprising at least one energy source configured for curing the at least one ceramic ink deposited on the printer stage.

66. The additive fabricator of any preceding or following embodiment/feature/aspect, wherein the at least one energy source comprises ultraviolet radiation, visible light, infrared radiation, microwave radiation, or any combination thereof.

67. The additive fabricator of any preceding or following embodiment/feature/aspect, further comprising a microcontroller configured to control the at least one actuator, the printer stage, the printhead, or any combination thereof.

68. A software designed to run on the microcontroller of any preceding or following embodiment/feature/aspect.

69. A system for additively producing proppants, the system comprising:
an additive fabricator configured to form green proppants; and
an oven configured to sinter the green proppants.

70. The system of any preceding or following embodiment/feature/aspect, further comprising a computer in operative communication with at least one of the additive fabricator and the oven, and configured to send instructions to, receive data from, or both, at least one of the additive fabricator and the oven.

71. An additive fabricator configured to produce proppants, the fabricator comprising:
a frame;
a printer stage operatively associated with the frame;
a powder bed positioned on the printer stage and configured to hold at least one ceramic ink;
an energy beam source operatively associated with the frame and positionable above the printer stage; and
at least one actuator configured to move the energy beam source and the printer stage relative to one another.

72. The additive fabricator of any preceding or following embodiment/feature/aspect, further comprising a supply container configured to hold the at least one ceramic ink and in fluid and supply the powder bed.

73. The additive fabricator of any preceding or following embodiment/feature/aspect, wherein the energy beam source is configured to emit a laser beam, an electron beam, or any combination thereof.

74. The additive fabricator of any preceding or following embodiment/feature/aspect, further comprising a gas source configured to supply gas to and fluidize the at least one ceramic ink when positioned in the powder bed.

75. A system for additively printing proppants, comprising the additive fabricator of any preceding or following embodiment/feature/aspect and a computer in operative communication with the additive fabricator and configured to send instructions to, receive data from, or both, the additive fabricator.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An additive method for forming proppants comprising:
applying a ceramic ink to a green proppant core through a printer head to produce a green proppant, wherein the ceramic ink comprises a ceramic material and a glass material; and
sintering the green proppant to produce a proppant wherein the proppant comprises a sintered shell and the proppant core, wherein the sintered shell comprises a glass-ceramic that is at least 50% crystalline.

2. The method of claim 1, wherein the ceramic ink is applied drop-wise, linearly, in a planar fashion, or any combination thereof.

3. The method of claim 1, further comprising forming at least one layer of the green proppant from the application of the ceramic ink.

4. The method of claim 3, further comprising curing the at least one layer after formation of the layer and before formation of a subsequent layer.

5. The method of claim 1, wherein the ceramic ink comprises at least one binding agent.

6. The method of claim 5, wherein the at least one binding agent comprises at least one monomer and further comprises at least one polymerization initiator.

7. The method of claim 5, further comprising debindering the green proppant.

8. The method of claim 6, further comprising applying energy to the applied ceramic ink to generate polymerization.

9. The method of claim 1, wherein at least two ceramic inks differing from one another are applied.

10. The method of claim 9, wherein the at least two ceramic inks comprise a first ink comprising ceramic material and a second ink comprising a binding agent, and the first ink is applied before applying the second ink.

11. The method of claim 10, wherein the application of the first and second inks are repeated multiple times to form the green proppant.

12. The method of claim 9, wherein the at least two ceramic inks comprise a first ink comprising a first ceramic material and a second ink comprising a second ceramic material differing in chemical composition from the first ceramic material.

13. The method of claim 1, wherein the green proppant further comprises a green proppant outer coating.

14. The method of claim 13, wherein the at least one ceramic ink comprises a first ceramic ink, and the first ceramic ink is applied to form the proppant core.

15. The method of claim 14, wherein the at least one ceramic ink comprises a second ceramic ink, the second ceramic ink is applied to form the green proppant shell.

16. The method of claim 15, wherein the at least one ceramic ink comprises a third ceramic ink, and the third ceramic ink is used to form the green proppant outer coating.

17. The method of claim 16, wherein at least two of the three ceramic inks differ from each other in respect to chemical property and/or physical property.

18. The method of claim 1, further comprising at least one subtractive process, herein the subtractive process comprises milling, lathing, stamping, crushing, etching, carving, or any combination thereof.

* * * * *